United States Patent
Lim et al.

(10) Patent No.: US 8,583,086 B2
(45) Date of Patent: Nov. 12, 2013

(54) MOBILE TERMINAL AND CHAT METHOD IN A MOBILE TERMINAL USING AN INSTANT MESSAGING SERVICE

(75) Inventors: Yong Suk Lim, Gyeonggi-do (KR); Hyun Ho Shin, Seoul (KR); Song Rae Cho, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 269 days.

(21) Appl. No.: 12/695,140

(22) Filed: Jan. 27, 2010

(65) Prior Publication Data

US 2010/0267369 A1    Oct. 21, 2010

(30) Foreign Application Priority Data

Apr. 21, 2009   (KR) .................. 10-2009-0034541

(51) Int. Cl.
*H04M 3/42*     (2006.01)
*H04M 1/725*    (2006.01)
*H04M 1/663*    (2006.01)
*G06F 3/038*    (2013.01)
*G09G 5/00*     (2006.01)

(52) U.S. Cl.
USPC ............... 455/414.1; 455/412.1; 345/214

(58) Field of Classification Search
USPC .......... 455/466, 414.1, 412.1; 345/173, 214; 715/781, 823
See application file for complete search history.

(56) References Cited

U.S. PATENT DOCUMENTS

| | | | |
|---|---|---|---|
| 7,089,278 B1 | 8/2006 | Churchill et al. | |
| 2004/0228531 A1* | 11/2004 | Fernandez et al. | 382/187 |
| 2004/0268263 A1* | 12/2004 | Van Dok et al. | 715/733 |
| 2008/0036743 A1* | 2/2008 | Westerman et al. | 345/173 |
| 2008/0080679 A1 | 4/2008 | Fernandez et al. | |
| 2010/0235778 A1* | 9/2010 | Kocienda et al. | 715/781 |

FOREIGN PATENT DOCUMENTS

| | | |
|---|---|---|
| CN | 101056188 | 10/2007 |
| CN | 101159705 | 4/2008 |
| EP | 1746790 | 1/2007 |
| EP | 1986432 | 10/2008 |

OTHER PUBLICATIONS

Hanisch et al., "Drag & Drop Scripting: How to Do Hypermedia Right", Eurographics 2003, 2003.*
Apple, "IP user guide", 2008.*
Apple, iPhone User Guide, 2008.*
State Intellectual Property Office of the People's Republic of China Application Serial No. 201010129672.4 Office Action dated Jan. 30, 2013, 5 pages.

* cited by examiner

*Primary Examiner* — Opiribo Georgewill
(74) *Attorney, Agent, or Firm* — Lee, Hong, Degerman, Kang & Waimey

(57) ABSTRACT

A mobile terminal and chat method in a mobile terminal using an instant messaging service are provided. According to the present invention, in the course of a chat with a specific party using an instant messaging service, a specific one of previous chat contents with at least one party including the specific party may be used as a chat content with the specific party.

20 Claims, 29 Drawing Sheets

(a)

(b)

(a)

(b)

MOBILE TERMINAL AND CHAT METHOD IN A MOBILE TERMINAL USING AN INSTANT MESSAGING SERVICE

CROSS-REFERENCE TO RELATED APPLICATIONS

Pursuant to 35 U.S.C. §119(a), this application claims the benefit of earlier filing date and right of priority to Korean Application No. 10-2009-0034541, filed on Apr. 21, 2009, the contents of which are hereby incorporated by reference herein in their entirety.

FIELD OF THE INVENTION

The present invention is directed to a mobile terminal, and more particularly, to a mobile terminal and chatting method therein using an instant messaging service.

DESCRIPTION OF THE RELATED ART

A terminal is a device which may be configured to perform various functions. Examples of such functions include data and voice communications, capturing images and video via a camera, recording audio, playing music files via a speaker system, and displaying images and video on a display. Some terminals include additional functionality that supports game playing, while other terminals are configured as multimedia players. More recently, terminals have been configured to receive broadcast and multicast signals that permit viewing of content such as videos and television programs.

Efforts are ongoing to support and increase the functionality of terminals. Such efforts include software and hardware improvements, as well as changes and improvements in the structural components which form the terminal.

Generally, a terminal capable of implementing an instant messaging service according to a related art permits a user to have a chat with another party using the instant messaging service and further allows receiving and sending data in a file format. Furthermore, the content of a chat is stored according to a selection made by the user. If a request is made by the user, stored chat content is provided to the user.

However, the related art methods make it inconvenient for a user to input each chat content one-by-one during the course of a chat with a specific party using an instant messaging service. Furthermore, even if a previous chat content is stored, a method of using the previously stored chat content as the chat content of a currently ongoing chat is not provided.

SUMMARY OF THE INVENTION

In one aspect of the present invention, a mobile terminal for performing a chat using an instant messaging service is provided. The mobile terminal includes a wireless communication unit configured to perform the chat with at least one chat party using the instant messaging service, a display unit configured to display at least one chat window including a chat content display region and a chat content input region while the chat with the at least one chat party is ongoing, the chat content display region displays at least one message previously transmitted to the at least one chat party and the chat content input region displays at least one new message that is to be transmitted to the at least one chat party, and a controller configured to control the wireless communication unit to perform the chat with a first chat party, control the display unit to display a first chat window when the first chat party is selected, control the wireless communication unit to perform the chat with a second chat party when the second chat party is selected and control the display unit to display at least one specific message transmitted during the chat with the first chat party in the chat content input region.

It is contemplated that the controller is further configured to control the display unit to delete the at least one specific message transmitted during the chat with the first chat part that is displayed in the chat content input region when at least one new text message is input in the chat content input region or edit the at least one specific message transmitted during the chat with the first chat part that is displayed in the chat content input region when an editing function is selected. It is further contemplated that the display unit is further configured to display identification information of at least one party that may be selected as the at least one chat party under control of the controller and the controller is further configured to process a selection of the second chat party on the display unit using the displayed identification information.

It is contemplated that the display unit is further configured to display a second chat window including a chat content display region and a chat content input region under control of the controller while the chat with the second chat party is ongoing and display the content of the at least one specific previous chat with the first chat party in the chat content input region of the second chat window. It is further contemplated that the display is further configured to display the content of the at least one specific previous chat with the first chat party in the chat content input region of the second chat window such that it is distinguishable from a content of the chat with the second chat party.

It is contemplated that the controller is further configured to control the display unit to switch the first chat window to the second chat window on a same region of the display unit if the second chat party is selected while the chat with the first chat party is ongoing. It is further contemplated that the wireless communication unit is further configured to transmit the content of the at least one specific previous chat with the first chat party to the second chat party under control of the controller, receive an input of a new chat content, delete the content of the at least one specific previous chat with the first chat party and transmit the new chat content to the second chat party under control of the controller or edit the content of the at least one specific previous chat with the first chat party and transmit the edited chat content to the second chat party under control of the controller.

It is contemplated that the display unit is further configured to display the transmitted content of the at least one specific previous chat with the first chat party, the transmitted new chat content or the transmitted edited chat content on the chat content display region of the second chat window under control of the controller. It is further contemplated that the controller is further configured to input the content of a last of a plurality of previous chats with the first chat party as the content of the chat with the second chat party.

It is contemplated that the controller is further configured to process an external signal to add a chat party to receive the content of the at least one specific previous chat with the first chat party and control the wireless communication unit to transmit the content of the at least one specific previous chat with the first chat party to the added chat party. It is further contemplated that the controller is further configured to input the content of a specific one of a plurality of previous chats with the first chat party that also included at least one additional chat party as the content of the chat with the second chat party.

It is contemplated that the mobile terminal further includes a user input unit configured to receive an input via a direction key manipulation and a selection of at least one specific previous chat content from a list of previous chat contents with at least one chat party and the controller is further configured to input the selected at least one specific previous chat content as a content of a chat with each of the first and second chat parties according to the input received via the direction key manipulation. It is further contemplated that the mobile terminal further includes a memory configured to store a content of the chat with the first and second chat parties.

In another aspect of the present invention, a method for performing a chat in a mobile terminal using an instant messaging service is provided The method includes displaying at least one chat window including a chat content display region and a chat content input region on a display while a chat with at least one chat party is ongoing, the chat content display region displays at least one message previously transmitted to the at least one chat party and the chat content input region displays at least one new message that is to be transmitted to the at least one chat party, performing the chat with a first chat party and displaying a first chat window on the display when the first chat party is selected, performing the chat with a second chat party when the second chat party is selected and displaying at least one specific message transmitted during the chat with the first chat party in the chat content input region.

It is contemplated that the method further includes deleting the at least one specific message transmitted during the chat with the first chat party from the chat content input region when at least one new text message is input in the chat content input region or editing the at least one specific message transmitted during the chat with the first chat part that is displayed in the chat content input region when an editing function is selected. It is further contemplated that the method further includes displaying identification information on the display of at least one party that may be selected as the at least one chat party and processing a selection of the second chat party using the displayed identification information.

It is contemplated that the method further includes displaying a second chat window including a chat content display region and a chat content input region on the display while the chat with the second chat party is ongoing and displaying the content of the at least one specific previous chat with the first chat party in the chat content input region of the second chat window. It is further contemplated that the method further includes displaying the content of the at least one specific previous chat with the first chat party in the chat content input region of the second chat window such that it is distinguishable from a content of the chat with the second chat party.

It is contemplated that the method further includes switching the first chat window to the second chat window on a same region of the display if the second chat party is selected while the chat with the first chat party is ongoing. It is further contemplated that the method further includes transmitting the content of the at least one specific previous chat with the first chat party to the second chat party, receiving an input of a new chat content, deleting the content of the at least one specific previous chat with the first chat party and transmitting the new chat content to the second chat party or editing the content of the at least one specific previous chat with the first chat party and transmitting the edited chat content to the second chat.

It is contemplated that the method further includes displaying the transmitted content of the at least one specific previous chat with the first chat party, the transmitted new chat content or the transmitted edited chat content on the chat content display region of the second chat window. It is further contemplated that the method further includes inputting the content of a last of a plurality of previous chats with the first chat party as the content of the chat with the second chat party.

It is contemplated that the method further includes processing an external signal to add a chat party to receive the content of the at least one specific previous chat with the first chat party and transmitting the content of the at least one specific previous chat with the first chat party to the added chat party. It is further contemplated that the method further includes inputting the content of a specific one of a plurality of previous chats with the first chat party that also included at least one additional chat party as the content of the chat with the second chat party.

It is contemplated that the method further includes receiving an input via a direction key manipulation and a selection of at least one specific previous chat content from a list of previous chat contents with at least one chat party and inputting the selected at least one specific previous chat content as a content of a chat with each of the first and second chat parties according to the input received via the direction key manipulation. It is further contemplated that the method further includes storing a content of the chat with the first and second chat parties.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

Mobile terminals described in this disclosure can include a mobile phone, a smart phone, a laptop computer, a digital broadcast terminal, a PDA (personal digital assistants), a PMP (portable multimedia player), a navigation system and similar terminals. Except where the disclosure is specifically related to a mobile terminal, it is apparent to those skilled in the art that the configurations according to an embodiment described in this disclosure is applicable to such a stationary terminal as a digital TV, a desktop computer and similar terminals.

Figure 1:
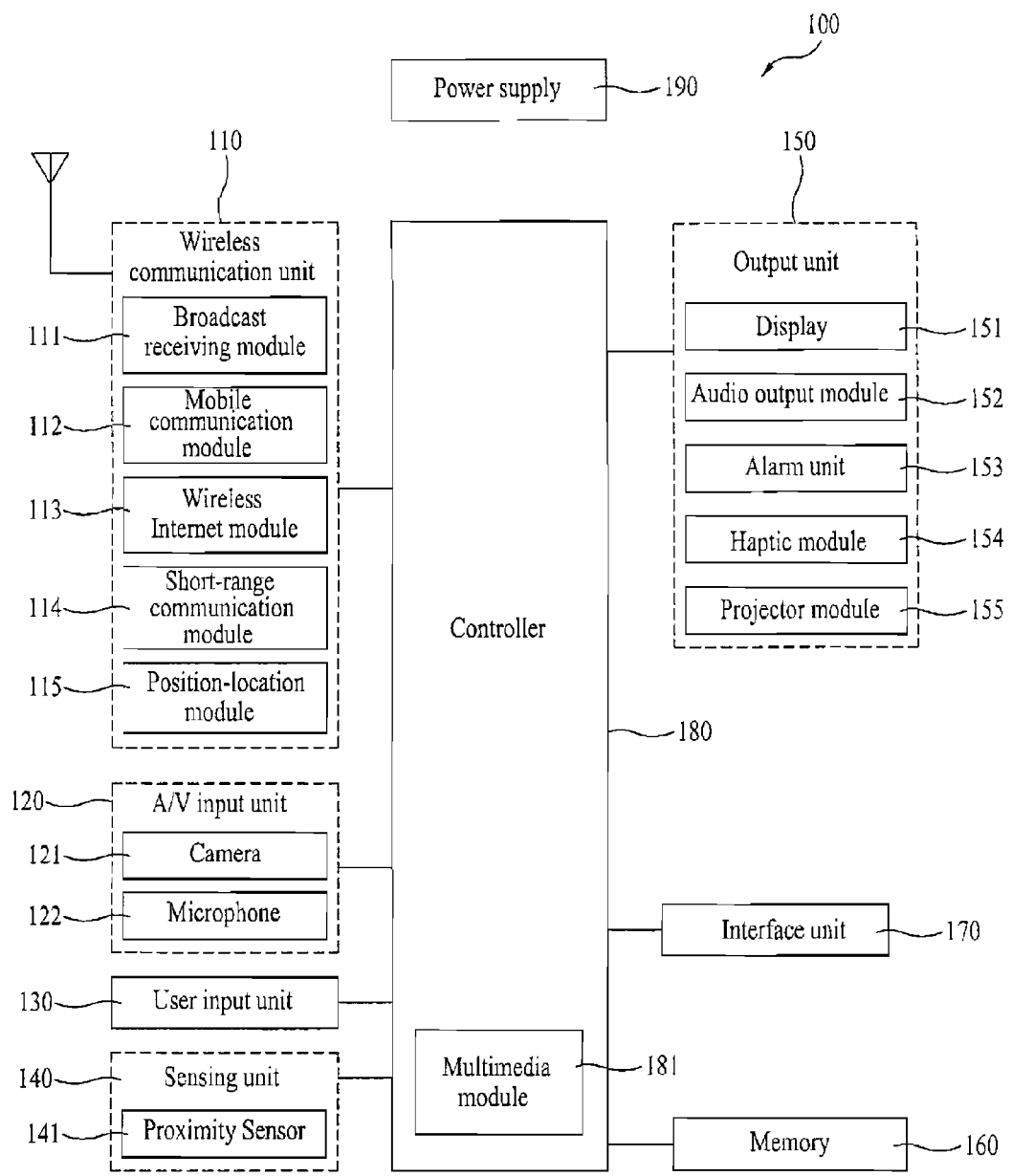
FIG. 1 is a block diagram of a mobile terminal according to one embodiment of the present invention.

FIG. 1 is a block diagram of mobile terminal 100 in accordance with an embodiment of the present invention. The mobile terminal 100 may be implemented using a variety of different types of terminals. Examples of such terminals include mobile phones, user equipment, smart phones, computers, digital broadcast terminals, personal digital assistants, portable multimedia players (PMP) and navigators.

By way of non-limiting example only, further description will be with regard to a slide-type mobile terminal 100. However, such teachings apply equally to other types of terminals.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components that permit wireless communication between the mobile terminal 100 and a wireless communication system or network within which the mobile terminal is located.

The broadcast receiving module 111 receives a broadcast signal and/or broadcast associated information from an external broadcast managing server via a broadcast channel. The broadcast channel may include a satellite channel or a terrestrial channel.

The broadcast managing server refers generally to a system that transmits a broadcast signal and/or broadcast associated information. Examples of broadcast associated information include information associated with a broadcast channel, a broadcast program, and a broadcast service provider. For example, the broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, or a data broadcast signal. The broadcast signal may further include a broadcast signal combined with a TV or radio broadcast signal.

The broadcast receiving module 111 may be configured to receive broadcast signals transmitted from various types of broadcast systems. By way of non-limiting examples, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T).

Receiving multicast signals is also possible. Data received by the broadcast receiving module 111 may be stored in a suitable device, such as the memory 160.

The mobile communication module 112 communicates wireless signals with one or more network entities, such as base station or Node-B. Such signals may represent, for example, audio, video, multimedia, control signaling, or data.

The wireless Internet module 113 supports Internet access for the mobile terminal 100. The wireless Internet module 113 may be internally or externally coupled to the mobile terminal 100. The wireless Internet technology can include, for example, WLAN (Wireless LAN) (Wi-Fi), Wibro (Wireless broadband), Wimax (World Interoperability for Microwave Access), or HSDPA (High Speed Downlink Packet Access).

The short-range communication module 114 facilitates relatively short-range communications. Suitable technologies for short-range communication may include, but are not limited to, radio frequency identification (RFID), infrared data association (IrDA), ultra-wideband (UWB), as well at the networking technologies commonly referred to as Bluetooth® and ZigBee®.

The position-location module 115 identifies or otherwise obtains the location of the mobile terminal 100. The position-location module 115 may be implemented using global positioning system (GPS) components that cooperate with associated satellites, network components, and combinations thereof.

The audio/video (A/V) input unit 120 is configured to provide audio or video signal input to the mobile terminal 100. As shown, the A/V input unit 120 includes a camera 121 and a microphone 122.

The camera 121 receives and processes image frames of still pictures or video, which are obtained by an image sensor in a video call mode or a photographing mode. The processed image frames can be displayed on the display 151. The image frames processed by the camera 121 can be stored in the memory 160 or can be externally transmitted via the wireless communication unit 110.

The microphone 122 receives an external audio signal while the mobile terminal 100 is in a particular mode, such as phone call mode, recording mode or voice recognition mode. This audio signal is processed and converted into digital data. The mobile terminal 100, and specifically the A/V input unit 120, may include assorted noise removing algorithms to remove noise generated in the course of receiving the external audio signal.

Data generated by the A/V input unit 120 may be stored in the memory 160, utilized by the output unit 150, or transmitted via one or more modules of the communication unit 110. If desired, two or more cameras 121 or microphones 122 may be provided.

The user input unit 130 generates input data responsive to user manipulation of an associated input device or devices. Examples of such devices include a keypad, a dome switch, a touchpad such as static pressure/capacitance, a jog wheel and a jog switch.

The sensing unit 140 provides status measurements of various aspects of the mobile terminal 100. For example, the sensing unit 140 may detect an open/close status of the mobile terminal 100, the relative positioning of components such as a display and keypad, a change of position of the mobile terminal or a component of the mobile terminal, a presence or absence of user contact with the mobile terminal, or orientation or acceleration/deceleration of the mobile terminal.

The mobile terminal 100 may be configured as a slide-type mobile terminal and the sensing unit 140 may sense whether a sliding portion of the mobile terminal is open or closed. The sensing unit 140 may also sense the presence or absence of power provided by the power supply 190 or the presence or absence of a coupling or other connection between the interface unit 170 and an external device.

The output unit 150 generates outputs relevant to the senses such as sight, hearing, and touch. The output unit 150 is illustrated in FIG. 1 as having a display 151, an audio output module 152, an alarm unit 153, a haptic module 154, and a projector module 155.

The display 151 is typically implemented to visually display (output) information associated with the mobile terminal 100. For example, if the mobile terminal 100 is operating in a phone call mode, the display 151 will generally provide a user interface (UI) or graphical user interface (GUI) that includes information associated with placing, conducting, and terminating a phone call. If the mobile terminal 100 is in a video call mode or a photographing mode, the display 151 may additionally or alternatively display images which are associated with these modes, the UI or the GUI.

One particular implementation of the present invention includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more displays 151.

Some of the displays 151 can be implemented as a transparent or optical transmittive type, which can be called a transparent display. The transparent display may be a TOLED (transparent OLED). A rear configuration of the display 151 can be implemented as an optical transmittive type as well. In this configuration, a user is able to see an object at the rear of the terminal body via the area occupied by the display 151.

At least two displays 151 can be provided in accordance with the implemented configuration of the mobile terminal 100. For example, a plurality of displays 151 can be arranged on a single face of the mobile terminal 100 such that they are spaced apart from each other or built in one body. Alternatively, a plurality of displays 151 can be arranged on different faces of the mobile terminal 100.

If the display 151 and a sensor for detecting a touch action (hereinafter called 'touch sensor') form a mutual layer structure such as a touch screen, the touch sensor can be configured as a touch film, a touch sheet, or a touchpad. The touch sensor can be configured to convert a pressure applied to a specific portion of the display 151 or a variation of a capacitance generated from a specific portion of the display 151 into an electric input signal. Furthermore, the touch sensor may be configured to detect a pressure of a touch as well as a touched position or size.

If a touch input is made to the touch sensor, signal(s) corresponding to the touch are transferred to a touch controller (not shown). The touch controller processes the signal(s) and then transfers the processed signal(s) to the controller 180. The controller 180 is able to determine whether a specific portion of the display 151 is touched.

A proximity sensor (not shown) can be provided at an internal area of the mobile terminal 100 enclosed by the touch screen or around the touch screen. The proximity sensor is a sensor that detects a presence or non-presence of an object approaching a specific detecting surface or an object existing around the proximity sensor using an electromagnetic field strength or infrared ray without mechanical contact. Therefore, the proximity sensor is more durable than a contact type sensor and also provides wider utility than a contact type sensor.

The proximity sensor may include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor or similar sensors. If the touch screen includes an electrostatic capacity proximity sensor, it is configured to detect the proximity of a pointer using a variation of electric field according to the proximity of the pointer. In this case, the touch screen (touch sensor) can be classified as the proximity sensor.

In the following description, an action where a pointer that approaches without contacting the touch screen is recognized as located on the touch screen is called a 'proximity touch'. Furthermore, an action where a pointer actually touches the touch screen is called a 'contact touch'. The meaning of a position on the touch screen proximity-touched by the pointer is a position of the pointer that vertically opposes the touch screen when the pointer performs the proximity touch.

The proximity sensor detects a proximity touch and a proximity touch pattern (e.g., a proximity touch distance, a proximity touch duration, a proximity touch position, or a proximity touch shift state). Information corresponding to the detected proximity touch and the detected proximity touch pattern can be output to the touch screen.

The audio output module 152 supports the audio output requirements of the mobile terminal 100. The audio output module 152 may be implemented using one or more speakers, buzzers, other audio producing devices, or combinations thereof.

The audio output module 152 functions in various modes such as call-receiving mode, call-placing mode, recording mode, voice recognition mode and broadcast reception mode. The audio output module 152 outputs audio relating to a particular function or status, such as call received, message received, or errors.

The alarm unit 153 may signal or otherwise identify the occurrence of a particular event associated with the mobile terminal 100. Typical events include call received, message received and user input received.

The alarm unit 153 outputs a signal for announcing the event occurrence via vibration as well as via video or audio signal. The video or audio signal can be output via the display 151 or the audio output unit 152. Therefore, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For example, different vibrations may be output by being synthesized together or may be output in sequence.

The haptic module 154 is able to generate various tactile effects as well as vibration. For example, the haptic module 154 may generate the effect of an arrangement of pins vertically moving against a contact skin surface, the effect of an injection/suction power of air though an injection/suction hole, the effect of skimming over a skin surface, the effect of contact with an electrode, the effect of electrostatic force, or the effect of hold/cold using an endothermic or exothermic device.

The haptic module 154 can be implemented to enable a user to sense the tactile effect through a muscle sense of a finger, an arm or other body part as well as to transfer the tactile effect through a direct contact. At least two haptic modules 154 can be provided in the mobile terminal 100 in accordance with the corresponding configuration of the mobile terminal.

The projector module 155 is an element for performing an image projector function using the mobile terminal 100. The projector module 155 may display an image, which is identical to or partially different from the image displayed on the display 151, on an external screen or wall according to a control signal from the controller 180.

The projector module 155 may include a light source (not shown) such as a laser for projecting an image externally, an image producing means for producing an image to output externally using the light generated from the light source, and a lens for enlarging the externally output image in a predetermined focus distance. The projector module 155 can further include a device for adjusting an image projected direction by mechanically moving the lens or the entire projector module.

The projector module 155 can be classified as a CRT (cathode ray tube) module, an LCD (liquid crystal display) module, or a DLP (digital light processing) module according to a type of display means. Specifically, the DLP module is operated by enabling the light generated from the light source to reflect on a DMD (digital micro-mirror device) chip and can be advantageous for limiting the size of the projector module 155.

Preferably, the projector module 155 is provided in a length direction of a lateral, front or backside direction of the mobile terminal 100. However, it is understood that the projector module 155 may be provided on any portion of the mobile terminal 100.

The memory 160 is generally used to store various types of data to support the processing, control, and storage requirements of the mobile terminal 100. Examples of such data include program instructions for applications operating in the mobile terminal 100, contact data, phonebook data, messages, pictures, and video.

The memory 160 may be implemented using any type or combination of suitable volatile and non-volatile memory or storage devices. Examples of memory types are random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk memory, card-type memory, and other similar memory or data storage devices.

The interface unit 170 is often implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, or an earphone port.

The identity module is a chip for storing various kinds of information for authenticating a user's authority to use the mobile terminal 100 and can include a User Identify Module (UIM), a Subscriber Identify Module (SIM), or a Universal Subscriber Identity Module (USIM). A device having the identity module (hereinafter called 'identity device') can be manufactured as a smart card. Therefore, the identity device is connectible to the mobile terminal 100 via a corresponding port.

When the mobile terminal 110 is connected to an external cradle, the interface unit 170 provides a passage for supplying the mobile terminal 100 with power from the cradle or a passage for delivering various command signals to the mobile terminal 100 that are input from the cradle by a user. Each of the various command signals input from the cradle or the power can operate as a signal enabling the mobile terminal 100 to determine that it is correctly loaded in the cradle.

The controller 180 typically controls the overall operations of the mobile terminal 100. For example, the controller 180 performs the control and processing associated with voice calls, data communications, instant message communication, video calls, camera operations and recording operations. Furthermore, the controller 180 may perform a pattern recognizing process for recognizing a writing input and a picture drawing input performed on the touch screen as characters or images.

The controller 180 may include a multimedia module 181 that provides multimedia playback. The multimedia module 181 may be configured as part of the controller 180 or implemented as a separate component.

The power supply 190 provides power required by the various components for the mobile terminal 100. The power may be internal power, external power, or combinations thereof.

Various embodiments described herein may be implemented in various ways. For example, the embodiments may be implemented in a computer-readable medium using computer software, hardware, or some combination thereof.

For a hardware implementation, the embodiments described may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination of these devices. The controller 180 may also implement such embodiments.

For a software implementation, the embodiments described herein may be implemented with separate software modules, such as procedures and functions, each of which perform one or more of the functions and operations described herein. The software codes can be implemented with a software application written in any suitable programming language and may be stored in memory, such as the memory 160, and executed by a controller or processor, such as the controller 180.

Figure 2A:
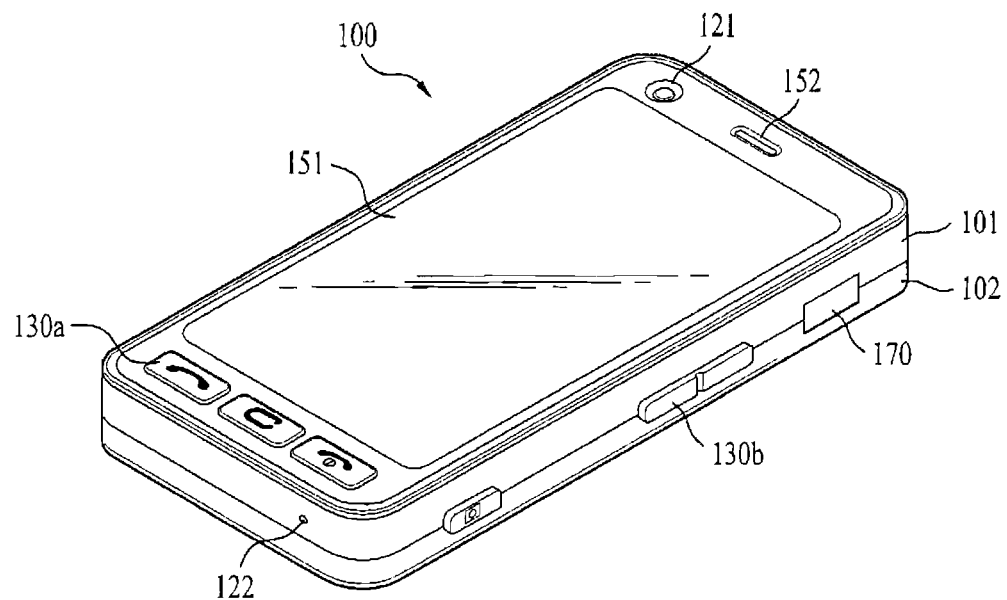
FIG. 2A is a front perspective diagram of a mobile terminal according to one embodiment of the present invention.
Figure 2B:
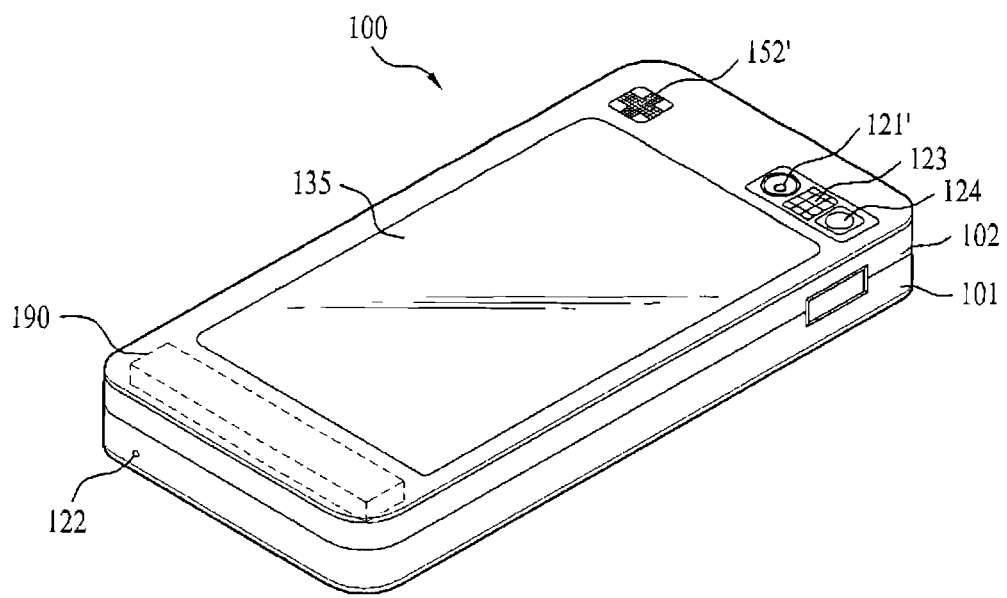
FIG. 2B is a rear perspective diagram of a mobile terminal according to one embodiment of the present invention.

FIG. 2A is a front perspective diagram of a mobile terminal according to one embodiment of the present invention. FIG. 2B is a perspective diagram of a backside of the terminal shown in FIG. 2A.

As illustrated in to FIG. 2A, the mobile terminal 100 includes a case (casing, housing, cover, etc.) configuring an exterior of the mobile terminal. The case can be divided into a front case 101 and a rear 102 case. Various electric/electronic parts are located in a space between the front 101 and rear 102 cases. Optionally, at least one middle case can be provided between the front 101 and rear 102 cases.

The cases 101 and 102 may be formed by injection molding synthetic resin. The cases 101 and 102 may also be formed of a metal substance such as stainless steel (STS) or titanium (Ti). The display 151, audio output unit 152, camera 121, manipulating units 130a and 130b, microphone 122, and interface unit 170 can be provided on the terminal body, specifically on the front case 101.

The display 151 occupies most of a main face of the front case 101. The audio output unit 152 and the camera 121 are provided on an area adjacent to one of the end portions of the display 151, while one manipulating input unit 130a and the microphone 122 are provided on another area adjacent to the other end portion of the display. The other manipulating unit 130b and the interface unit 170 can be provided on lateral sides of the front and rear cases 101 and 102.

The input unit 130 is manipulated to input a command for controlling an operation of the terminal 100 and may include the manipulating units 130a and 130b. The manipulating units 130a and 130b can be called a manipulating portion and may adopt any mechanism having a tactile manner that enables a user to perform a manipulation action by experiencing a tactile feeling.

Content input via the first or second manipulating unit 130a or 130b can be diversely set. For example, a command such as start, end, or scroll is input via the first manipulating unit 130a and a command for a volume adjustment of sound output from the audio output unit 152 or a command for switching to a touch recognizing mode of the display 151 can be input via the second manipulating unit 130b.

As illustrated in FIG. 2B, an additional camera 121' can be provided on a rear side of the terminal body, specifically on the rear case 102. The camera 121' has a photographing direction that is substantially opposite to that of the camera 121 illustrated in FIG. 2A and may have pixels differing from those of the camera 121.

Preferably, the camera 121 illustrated in FIG. 2A has pixels low enough to capture and transmit a picture of user's face for a video call, while the camera 121' has high pixels for capturing a general subject for photography without transmitting the captured subject. Each of the cameras 121 and 121' can be installed such that they can be rotated or popped up.

A flash 123 and a mirror 124 are additionally provided adjacent to the camera 121'. The flash 123 projects light toward a subject for photographing the subject using the camera 121'. If user attempts to take a self-photography using the camera 121', the mirror 124 enables the user to view his or her face reflected by the mirror 124.

An additional audio output unit 152' can be provided on the rear side of the terminal body. The additional audio output unit 152' may implement a stereo function together with the audio output unit 152 illustrated in FIG. 2A and may be used for implementation of a speakerphone mode while talking.

A broadcast signal receiving antenna 124 can be provided on the lateral side of the terminal body as well as an antenna for communication. The antenna 124 comprising a portion of the broadcast receiving module 111 illustrated in FIG. 1 can be retractably provided on the terminal body.

A power supply unit 190 for supplying power to the terminal 100 is provided. The power supply unit 190 can be configured to be located within the terminal body. Alternatively, the power supply unit 190 can be configured to be detachably connected to the terminal body.

A touchpad 135 for detecting a touch can be provided on the rear case 102. The touchpad 135 can be configured as a light transmittive type similar to the display 151.

If the display 151 is configured to output visual information from both its faces, it possible to recognize the visual information via the touchpad 135 as well. The information output from both faces of the display 151 can be entirely controlled by the touchpad 135. Alternatively, a display may be provided on the touchpad 135 so that a touchscreen can be provided on the rear case 102 as well.

The touchpad 135 is activated by interconnecting with the display 151 of the front case 101. The touchpad 135 can be provided at the rear of the display 151 in parallel. The touchpad 135 can have a size equal to or smaller than the size of the display 151.

Figure 3:
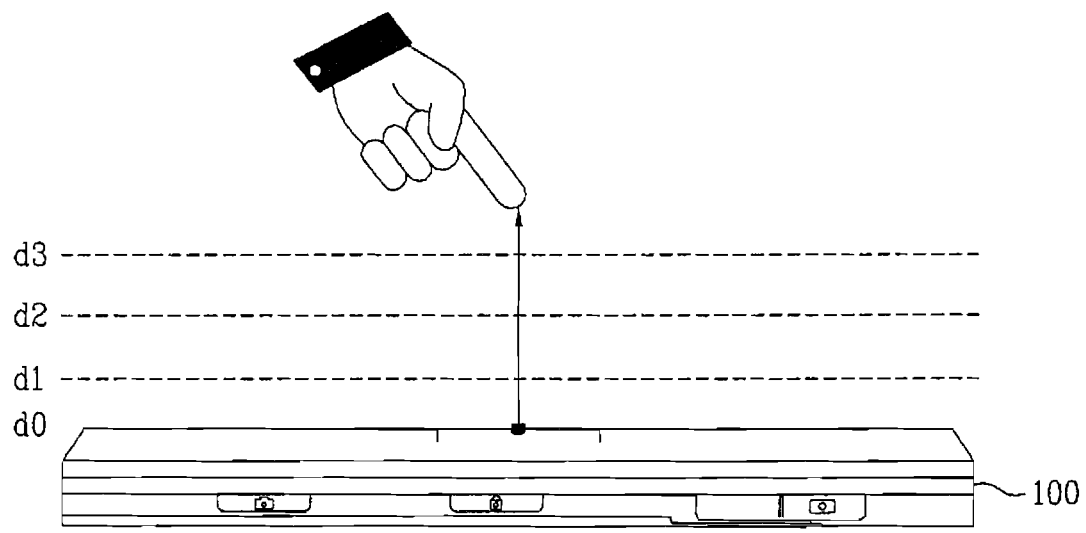
FIG. 3 is a diagram illustrating the concept of proximity depth of a proximity sensor.

The proximity sensor 141 illustrated in FIG. 1 is explained in detail with reference to FIG. 3. FIG. 3 is a conceptional diagram illustrating a proximity depth of the proximity sensor 141.

As illustrated in FIG. 3, when a pointer such as a user's finger or a pen approaches the touchscreen, the proximity sensor 141 provided within or in the vicinity of the touchscreen detects the approach of the pointer and then outputs a proximity signal. The proximity sensor 141 can be configured to output a different proximity signal according to a distance between the pointer and the proximity-touched touch screen (hereinafter 'proximity depth').

FIG. 3 illustrates a cross-section of the touchscreen provided with a proximity sensor 141 having three proximity depths. It is understood that a proximity sensor 141 having less than proximity depths or 4 or more proximity depths is possible.

If the pointer is fully contacted with the touchscreen (d0), a contact touch is recognized. If the pointer is located such that it is spaced apart from the touchscreen by a distance less than d1, a proximity touch to a first proximity depth is recognized. If the pointer is located such that it is spaced apart from the touchscreen by a distance between d1 and d2, a proximity touch to a second proximity depth is recognized. If the pointer is located such that it is spaced apart from the touchscreen by a distance less than d3 or equal to or greater than d2, a proximity touch to a third proximity depth is recognized. If the pointer is located such that it is spaced apart from the touchscreen by a distance equal to or greater than d3, a released proximity touch is recognized.

The controller 180 recognizes the proximity touch as one of various input signals according to the proximity depth and position of the pointer. The controller 180 performs various operation controls according to the various input signals.

An instant messaging service (IMS) according to the present invention is a service capable of performing real-time data communication such as a text chat, a speech chat, a video chat, or file transceiving between a plurality of terminals provided with IMS implementation functions based on an Internet protocol. The IMS can include a mobile instant messaging service that supports an IMS between mobile terminals.

Figure 4A:
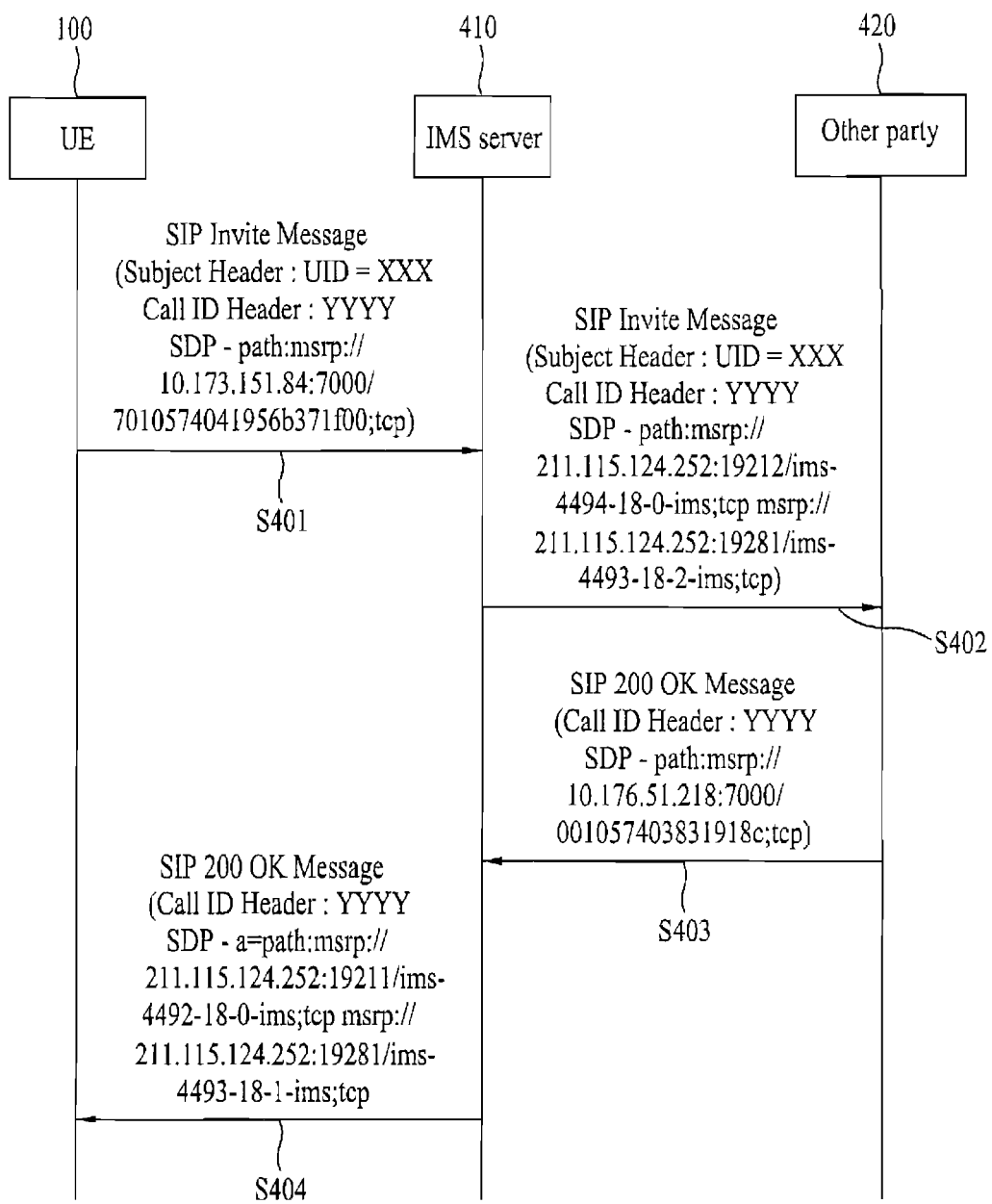
FIG. 4A and FIG. 4B are diagrams illustrating a method of setting an instant messaging section between a mobile terminal and another party according to one embodiment of the present invention.
Figure 4B:
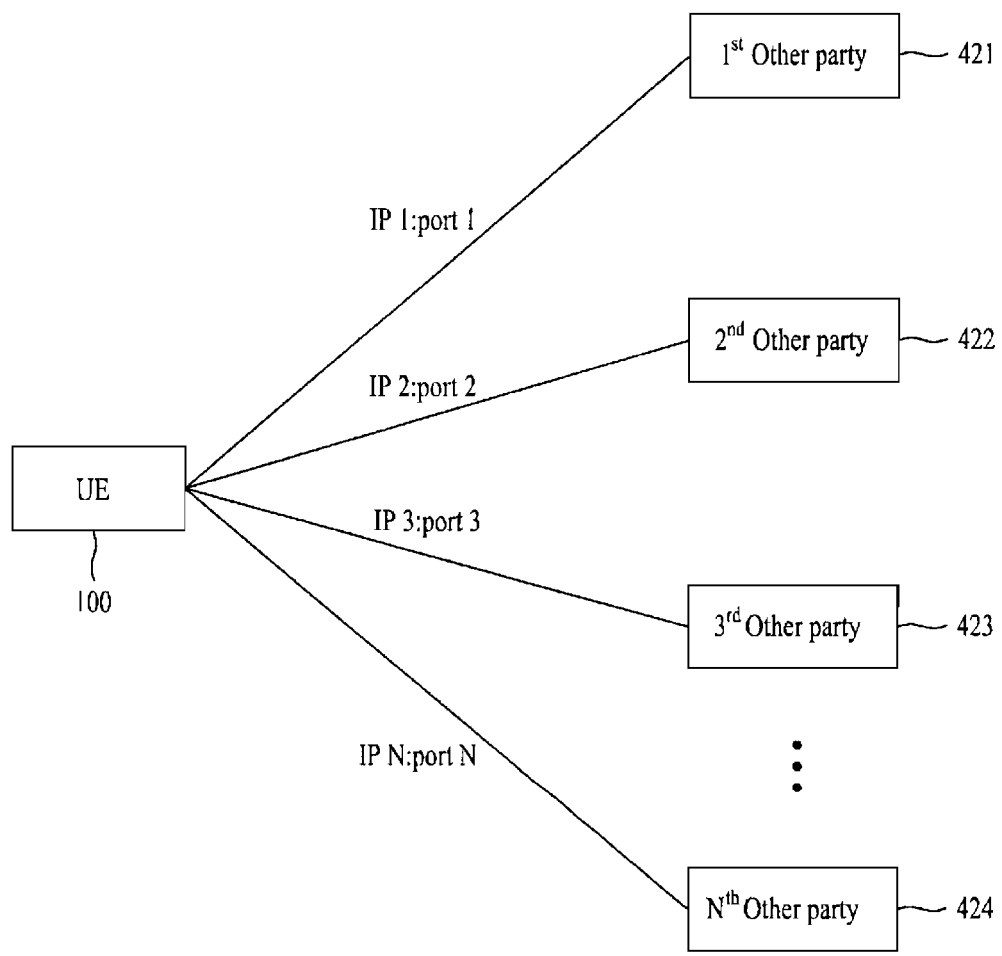

A method of setting an instant message (IM) session using an IMS is explained with reference to FIGS. 4A and 4B. FIG. 4A illustrates a method of setting an IM session with one other party and FIG. 4B illustrates a method of setting IM sessions with a plurality of other parties.

As illustrated in FIG. 4A, the mobile terminal 100 tries to connect an IM session by sending an SIP invite message, which is a message to request an IM session setting, to an IMS server 410 [S401]. The SIP invite message can include a call ID header value for identifying an IM session and address information of a server that will receive data transmitted by the mobile terminal 100 according to an IM session setting. Therefore, even if a plurality of IM sessions are set, it possible to identify each of the IM sessions using a call ID header value of the corresponding IM session.

The IMS server 410 sends the received SIP invite message to another party's terminal 420 [S402]. The SIP invite message can include address information of a server that will receive this data.

The other party's terminal 420 receives the SIP invite message from the IMS server 410 and then sends a response message for the IMS session setting request (SIP 200 OK message) to the IMS server 410 [S403]. The response message can include address information of a server that will receive the data transmitted by the other party's terminal 420 to the IMS server 410.

The IMS server 410 receives the response message from the other party's terminal 420 and then transmits the received response message to the mobile terminal 100 [S404]. The response message can include address information of a server that will receive this data.

Once the IM session is set up, a chatting operation or a file transceiving operation can be performed via the IM session. As illustrated in FIG. 4B, it is possible to set up IM sessions with a plurality of other parties 421-424 by performing the above process described with reference to FIG. 4A with the plurality of other parties.

Figure 5:
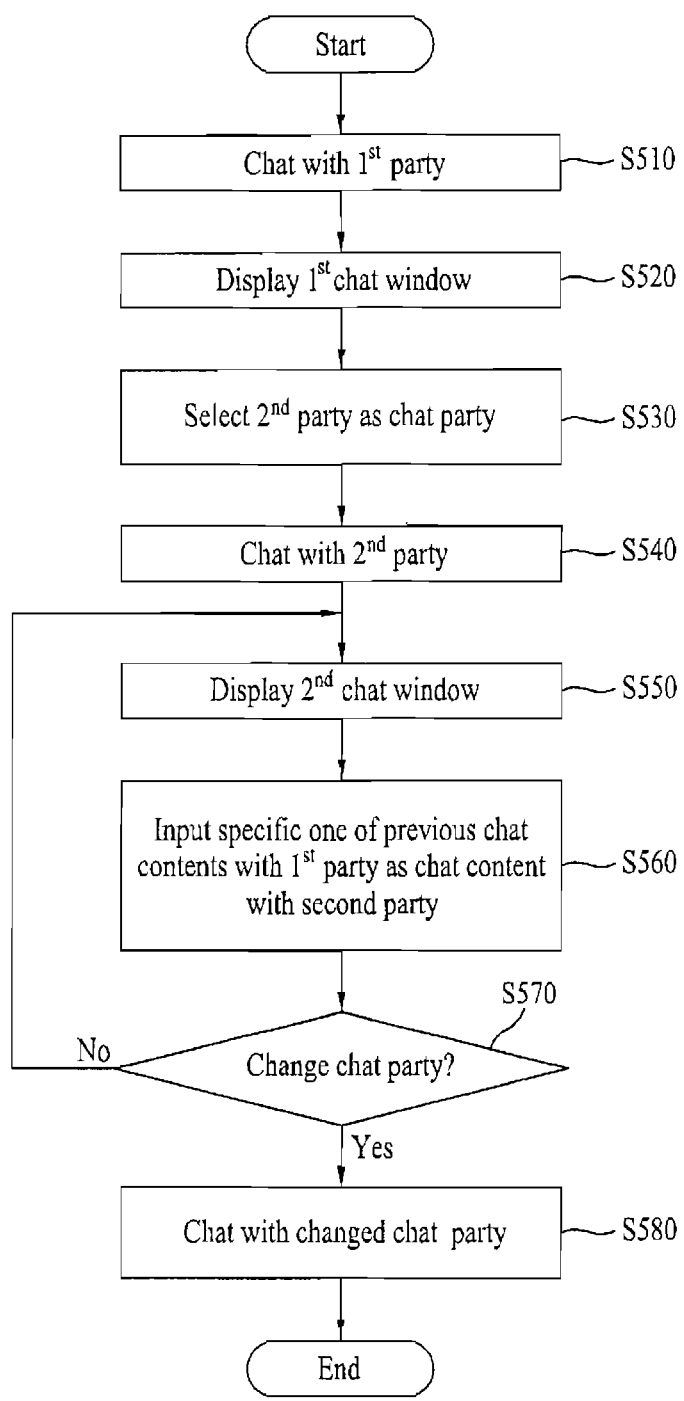
FIG. 5 is a flowchart illustrating a chat method of a mobile terminal using an instant messaging service according to one embodiment of the present invention.

A chat method of a mobile terminal 100 using an instant messaging service (IMS) according to the present invention is explained with reference to FIG. 5. FIG. 5 illustrates a flowchart for a chat method of a mobile terminal 100 using an instant messaging service according to one embodiment of the present invention.

In the following description, a chat via IMS can include a speech chat, a video chat, file transceiving or a text chat. The chat via IMS for is limited to the text chat with file transceiving included in the text chat. The chat via IMS includes a con-on-one chat or a chat with a plurality of other users. For purposes of this disclosure, the chat is limited to the one-on-one chat. Moreover, chat content according to this disclosure can be stored in the memory 160 under the control of the controller 180.

As illustrated in FIG. 5, the mobile terminal 100 performs a chat with a first party using an IMS (hereinafter 'first chat'). The first chat is performed via the wireless communication unit 110 under the control of the controller 180 [S510].

If a menu item, key or a key region corresponding to an IMS execution is selected by a user, the mobile terminal 100 can be connected to an IMS managing server (not shown) using the wireless communication unit 110, and specifically via the wireless internet module 113. Subsequently, the mobile terminal 100 receives the first party's status information from the connected IMS managing server or performs a chat with a specific party via the connected IMS managing server.

When performing the first chat [S510], the mobile terminal 100 receives status information of current chat-available parties from the IMS managing server and then displays the received status information in list form. If a first party is selected as a chat party from the list by a user, the mobile terminal 100 executes the first chat [S510]. The chat content transceived when performing the first chat [S510] can be stored in the memory 160 under the control of the controller 180.

The IMS managing server may be an Internet component that transceives status information of each mobile terminal or a user of the corresponding mobile terminal or transceives chat content or a file according to an IM session setting when performing an IMS among a plurality of mobile terminals. The status information is information related to a status of a terminal or a user of the terminal subscribed for the IMS and can include on/off, absence, in-meeting, at-table, very-busy, calling, or on-duty.

When performing a chat with the first party [S510], the mobile terminal 100 displays a first chat window via the display 151 under the control of the controller 180 [S520]. The first chat window can include a chat content display region for displaying a chat content transceived with the first party and a chat content input region for displaying a chat content input for transmission to the first party. The user is able to input chat content for transmission to the first party by manipulating the user input unit 130, such as a keypad.

A process for displaying a last transmitted chat content on a chat content input region of a first chat window is explained in detail with reference to the accompanying drawings. For clarity, it is assumed that a name of the first party is 'Chul Soo'.

Figure 6:
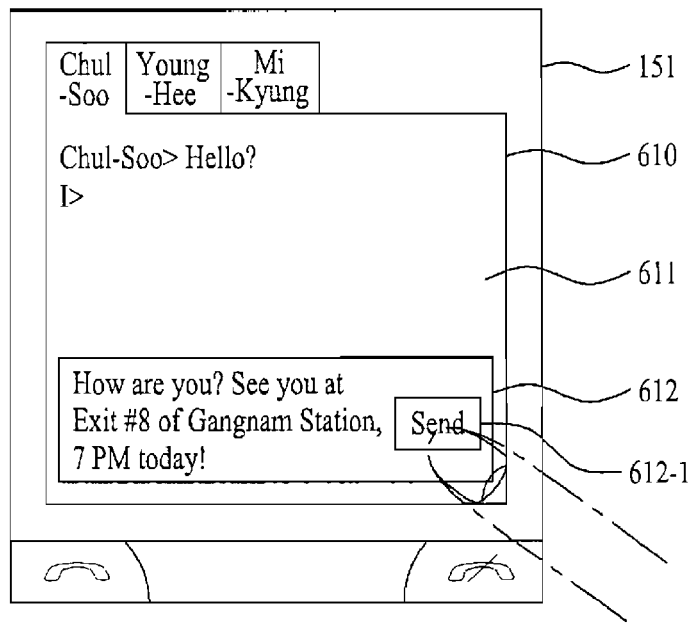
FIGS. 6 to 8 are diagrams illustrating a process for displaying a last transmitted chat content in a chat content input region of a first chat window according to one embodiment of the present invention.

As illustrated in FIG. 6, a first chat window on the display 151 can include a chat content display region 611 and a chat content input region 612. Chat content transceived with Chul Soo can be displayed on the chat content display region 611 and chat content input for transmission to Chul Soo can be displayed on the chat content input region 612.

Figure 7A:
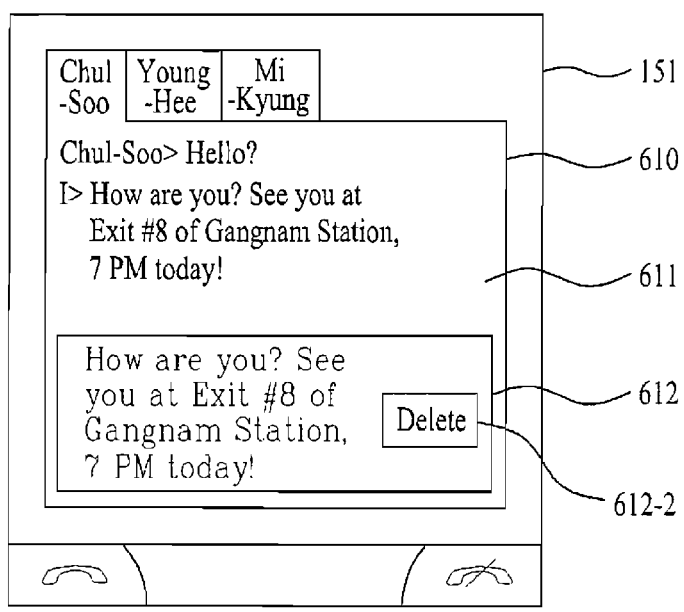
Figure 7B:
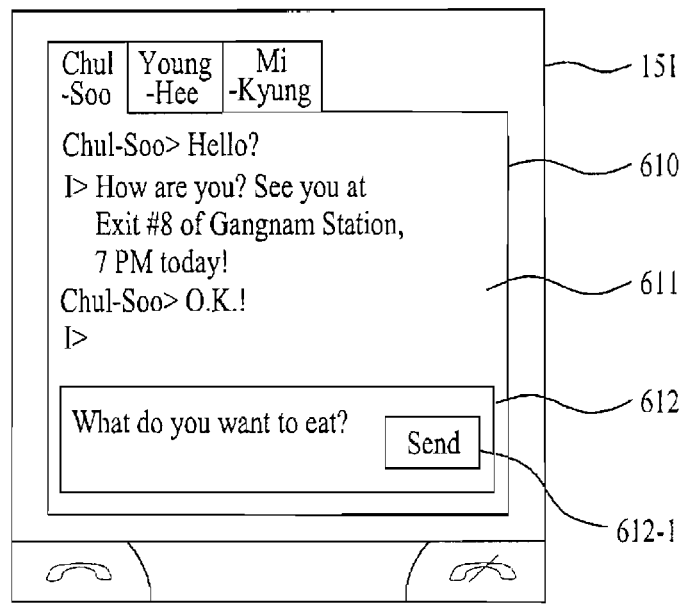

As illustrated in FIGS. 7A and 7B, if a 'send' region 612-1 for inputting a command for transmitting chat content to Chul Soo is selected by a user in FIG. 6, the mobile terminal 100 transmits an input chat content (e.g., 'How are you? See you at Exit #8 of Gangnam Station, 7 PM today!') to Chul Soo's terminal via an IMS managing server. The input chat content is displayed on the chat content display region 611.

As illustrated in FIG. 7A, although a last transmitted chat content (hereinafter 'last chat content') has been transmitted to Chul Soo, the mobile terminal 100 still displays the last chat content on the chat content input region 612. If a 'delete' region 612-2 is selected by the user, the mobile terminal 100 deletes the last chat content from the chat content input region 612, receives an input of a new chat content from the user, and then displays the received input on the chat content input region 612.

As illustrated in FIG. 7B, while the last chat content is displayed on the chat content input region 612, if a new chat content is input by the user, the mobile terminal 100 deletes the last chat content from the chat content input region 612 and then displays the newly input chat content on the chat content input region 612.

Figure 8:
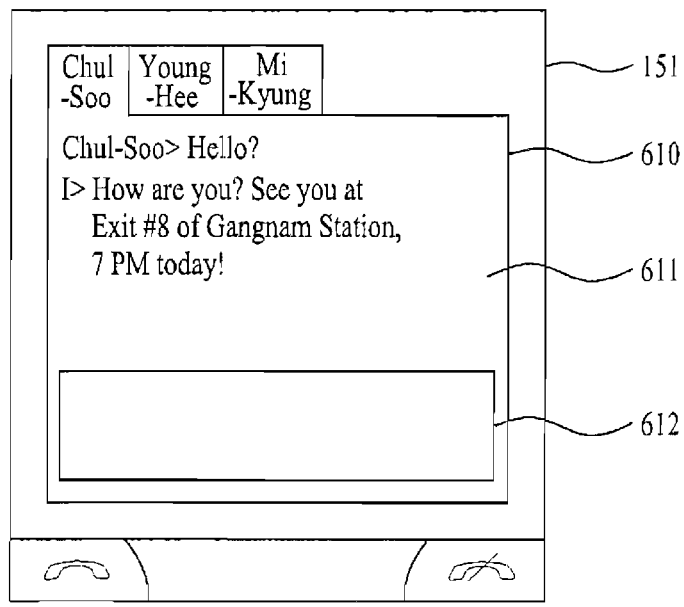
Figure 9A:
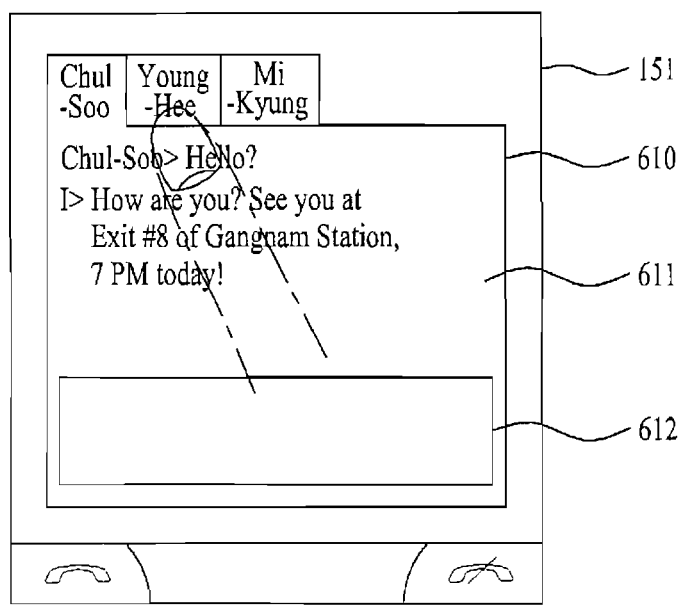
FIGS. 9A to 10 are diagrams illustrating a process for inputting a previous chat content last transmitted in a first chat by a user as a chat content of a second chat according to one embodiment of the present invention.
Figure 9B:
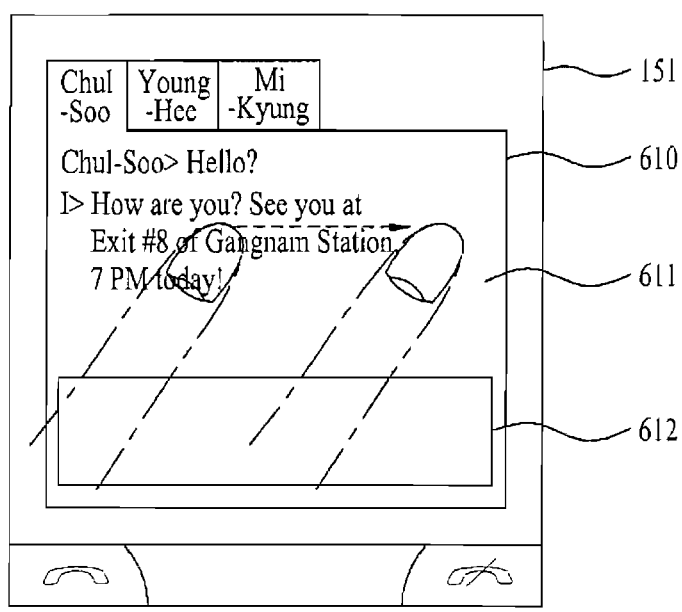

As illustrated in FIG. 8, if the mobile terminal 100 transmits the last chat content to Chul Soo, the mobile terminal 100 no longer displays the last chat content on the chat content input region 612. However, if a menu item, key or key region corresponding to a previous chat content display is selected by the user, the last chat content or a previous chat content can be displayed on the chat content input region 612.

As illustrated in FIG. 5, if a chat party selecting operation is performed by the user via the user input unit 130, the mobile terminal 100 selects a second party corresponding to the input chat party selecting operation under the control of the controller 180 [S530]. If the second party is selected as the chat party, the first chat can be maintained or terminated. If the first chat is maintained, the mobile terminal 100 performs the first chat and the second chat simultaneously or selectively according to a selection made by the user.

During the first chat [S510], the mobile terminal 100 displays identification information of a party selectable as a chat party on a portion of a screen. The identification information is information registered in the IMS to identify each terminal or a terminal user when performing the IMS and can include a nickname, a title, contact information, and/or image information (icon, symbol, photo, animation, or flash). For example, the identification information is displayed in a tag format of the first chat window, displayed on a separate display region, or displayed in a list form.

The party selectable as the chat party can include a party currently connected to an IMS, a party in a chat state according to a current IM session setting, a party belonging to the same group as the first party, or a party having chatted within a predetermined period of time. The party selectable as the chat party is a terminal or a terminal user mutually registered to transceive data with the mobile terminal 100 using the IMS.

A process for selecting a second party as a chat party is explained in detail with reference to the accompanying drawings. For clarity and convenience of description, it is assumed that the second party is 'Young Hee' and an example of displaying identification information in a tag format is shown in the accompanying drawings.

FIGS. 9A, 10, 11A and 13A illustrate a case where Young Hee is selected as a chat party if a region (hereinafter 'second identification region') is selected by a user on which identification information of Young Hee is displayed. If a touch screen is provided, when a second identification region is touched by a user, Young Hee is selected as a chat party.

FIGS. 9B, 10B, 11B and 13B illustrate a case where Young Hee is selected as a chat party according to a touch & drag distance and direction of a touch & drag performed on a first chat window 610 from a first point to a second point. For example, if there is a plurality of parties selectable as a chat party, an indicated party located before of after Chul Soo may be selected as a chat party via a touch & drag operation.

If a touch and drag direction is in a right direction or a down direction, a party located in order after Chul Soo is selected as a chat party. If a touch and drag distance is in a left direction or an up direction, a party located in order before Chul Soo is selected as a chat party.

As illustrated in FIG. 5, the mobile terminal 100 performs a second chat with the second party selected as the chat party [S530] using an IMS via the wireless communication unit 110 under the control of the controller 180 [S540]. The mobile terminal 100 displays a second chat window via the display 151 under the control of the controller 180 for the chat with the second party [S550].

Subsequently, the mobile terminal 100 inputs a specific chat content from the previous first chat with the first party as a chat content (hereinafter 'second chat content') with the second party under the control of the controller 180 [S560]. The specific previous chat content input as the second chat content with the second party can be displayed on a chat content input region of the second chat window.

The second chat window can be displayed on the same region of the screen of the first chat window. Therefore, when the second party is selected as the chat party, the first chat is switched to the second chat, and the mobile terminal 100 changes the first chat window to the second chat window for display on the same region under the control of the controller 180. Alternately, the first chat window and the second chat window can be displayed by discriminating display regions from each other.

The previous chat contents can include a previous chat content transmitted by the mobile terminal 100, a previous chat content transmitted by the first party, or a file transceived by the mobile terminal 100 or the first party. Furthermore, the specific previous chat content can include the chat content last transceived with the first party among the above described previous chat contents.

A process for inputting a specific previous chat content as a second chat content is explained in detail with reference to the accompanying drawings. For clarity and convenience of description, it is assumed that first party is 'Chul Soo' and the second party is 'Young Hee'.

Figure 10:
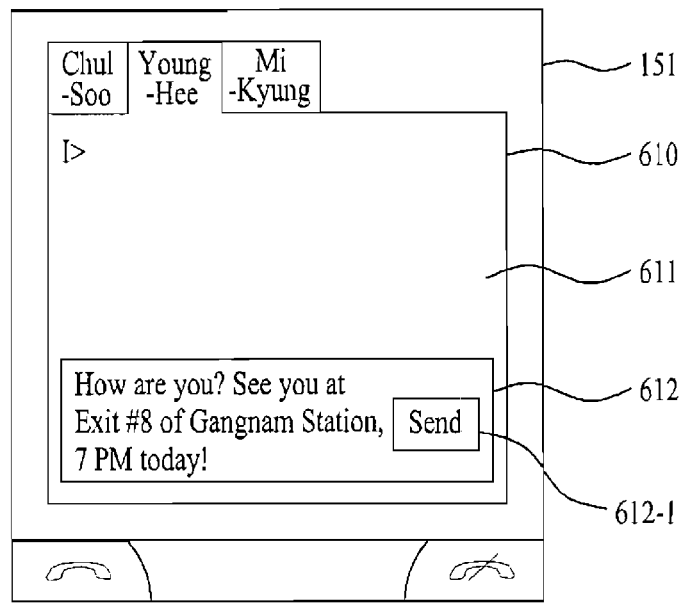
Figure 11A:
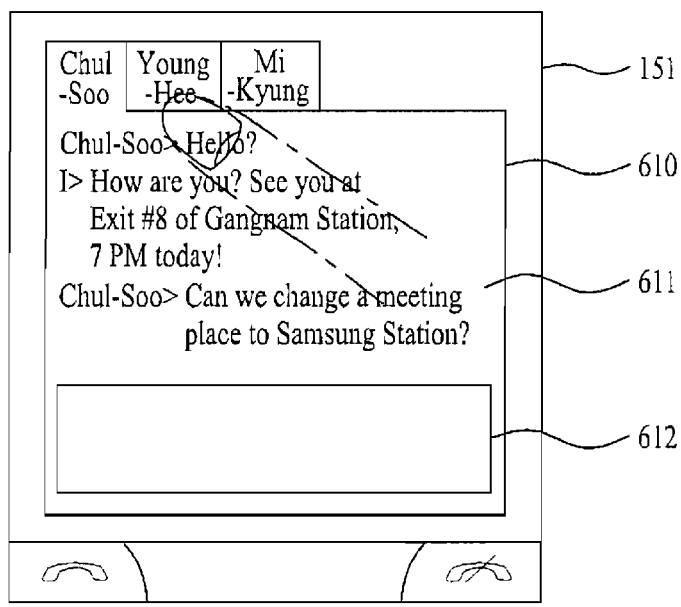
FIGS. 11A to 12 are diagrams illustrating a process for inputting a previous chat content last transmitted in a first chat by a first party as a chat content of a second chat according to one embodiment of the present invention.
Figure 11B:
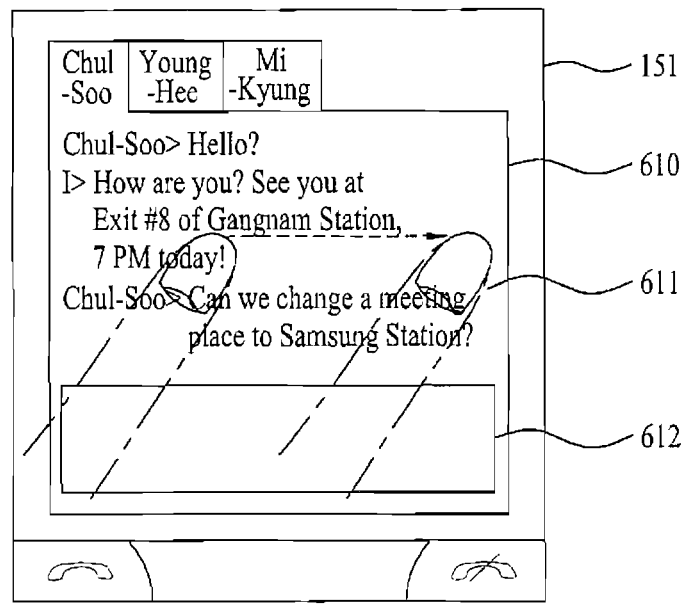

As illustrated in FIG. 10, the mobile terminal 100 inputs a previous chat content (e.g., 'How are you? See you at Exit #8 of Gangnam Station!'), which was last transmitted to Chul Soo by the mobile terminal 100 in the first chat, as a second chat content. The mobile terminal 100 then displays the input second chat content on a chat content input region 612.

Figure 12:
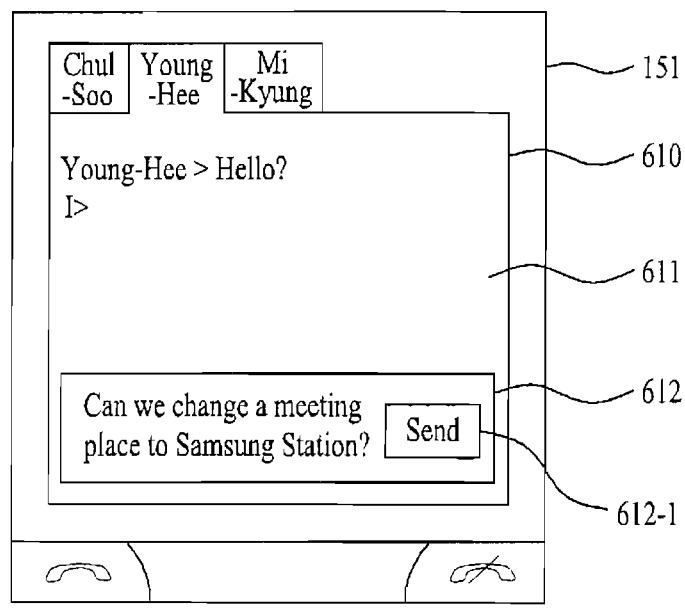
Figure 13A:
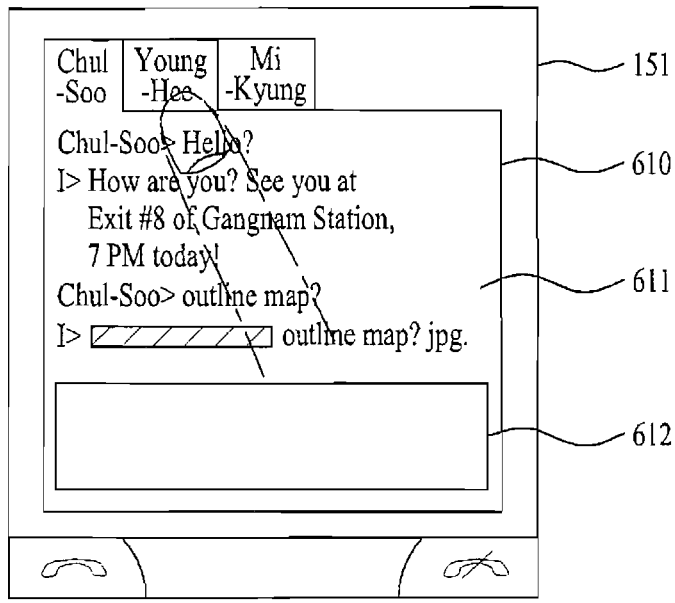
FIGS. 13A to 14 are diagrams illustrating a process for inputting a file transceived last in a first chat as a chat content of a second chat according to one embodiment of the present invention.
Figure 13B:
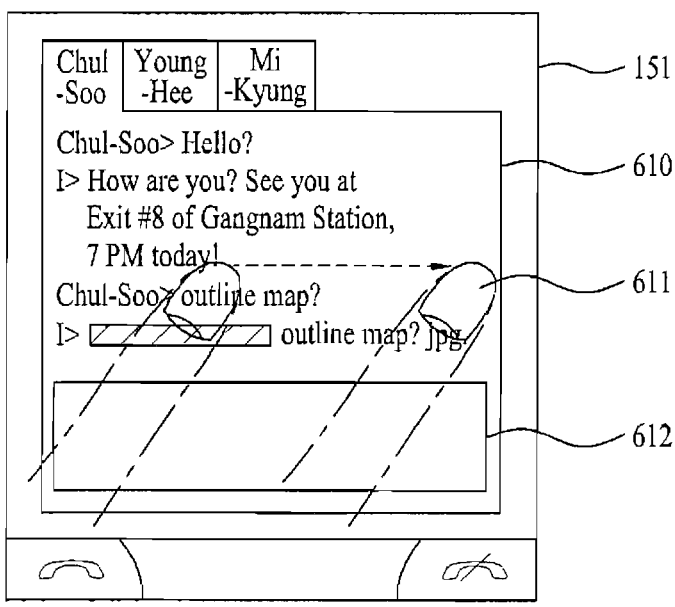

As illustrated in FIG. 12, the mobile terminal 100 inputs a previous chat content (e.g., 'Can we change a meeting place into Samsung Station?'), which was last received from Chul Soo in the first chat, as a second chat content. The mobile terminal 100 then displays the input second chat content on a chat content input region 612.

Figure 14:
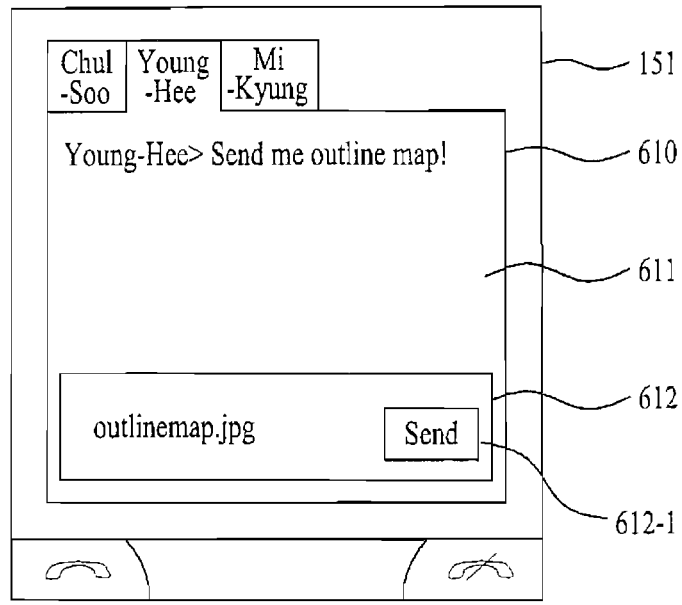

As illustrated in FIG. 14, the mobile terminal 100 inputs a file (e.g., 'outlinemap.jpg'), which was last transmitted to Chul Soo by the mobile terminal 100 in the first chat, as a second chat content. The mobile terminal 100 then displays the input second chat content on a chat content input region 612.

The first party can include at least one previous chat party having chatted prior to the second chat with the second party. For example, the first party can include a party of a chat performed immediately before selection of the second party as the chat party. The first party can include at least one party from all previous chats performed within a predetermined period of time, all parties of a previous chat among currently connected parties or parties designated by a user.

Specifically, if a plurality of previous chat parties exists, a specific previous chat content from the previous chat with a specific one of a plurality of previous chat parties can be input as the chat content with the second party [S560]. Furthermore, a previous chat content with the first party or a specific previous chat content from all previous chat contents with a plurality of previous chat parties can be input as the second chat content with the second party [S560].

A process for inputting a previous chat content transceived with a specific one of a plurality of previous chat parties as the second chat content is explained in detail with reference to the accompanying drawings. For clarity and convenience of explanation, it is assumed that previous chat parties are 'Chul Soo' and 'Mi Kyung' and the second party is 'Young Hee'.

Figure 15A:
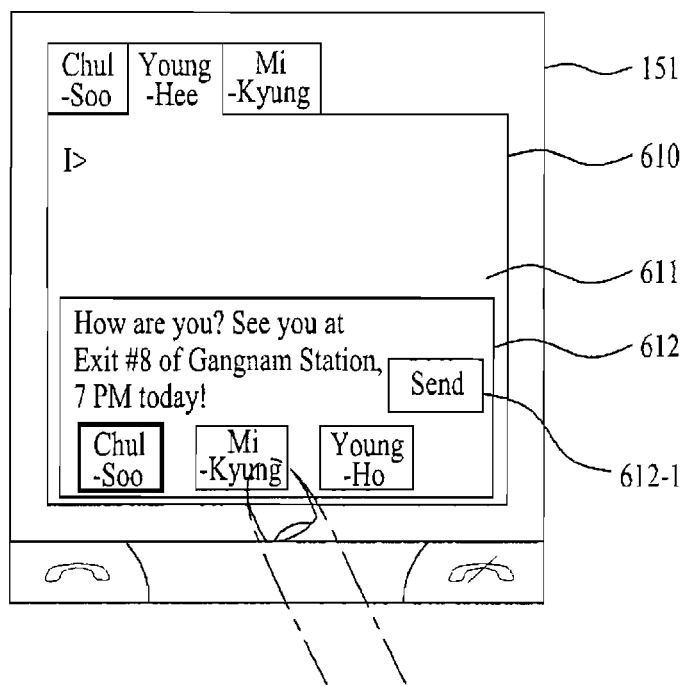
FIG. 15A and FIG. 15B are diagrams illustrating a process for inputting a chat content transceived with a specific one of a plurality of previous chat parties as a chat content of a second chat according to one embodiment of the present invention.
Figure 15B:
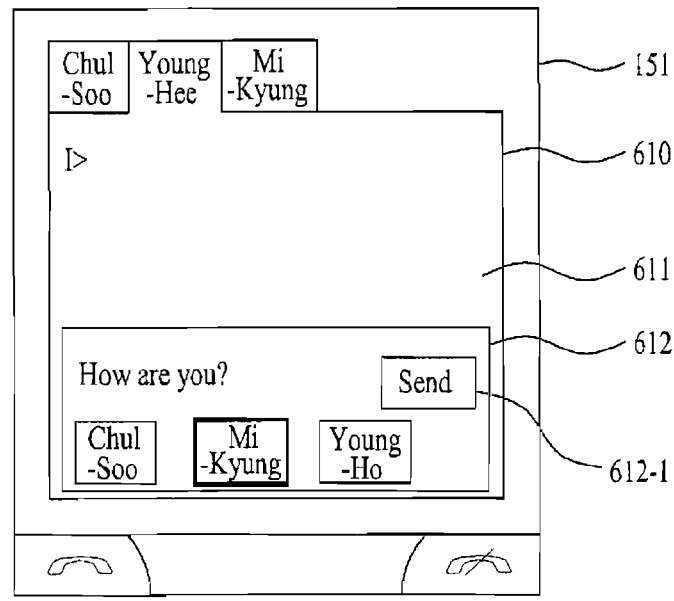

As illustrated in FIG. 15A, if a previous chat content with Chul Soo among previous chat parties is input as the second chat content, identification information of Chul Soo can be distinguishably displayed in order to announce that the previous chat content with Chul Soo is input as the second chat content. FIG. 15B shows a case where a previous chat content with Mi Kyung among previous chat parties is input as the second chat content. As illustrated in FIGS. 15A and 15B, a region for announcing the parties to a chat, which corresponds to a previous chat content selected as the second chat content, can be provided separate from the identification information.

Figure 16:
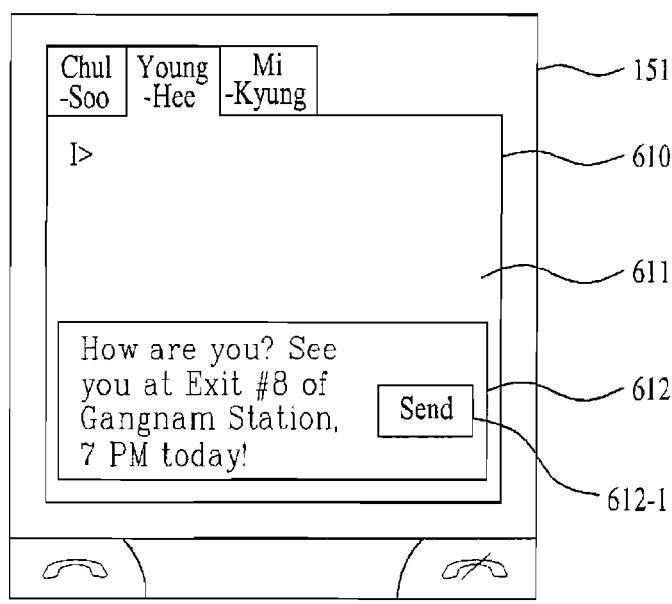
FIG. 16 is a diagram illustrating the display of a previous chat content distinguishably in a chat content input region of a second chat window according to one embodiment of the present invention.

A specific previous chat content can be distinguishably displayed such that it can be distinguished from a normally input chat content. For example, the specific previous chat content can be distinguishably displayed using text color, background color, font size, font type, or bold. FIG. 16 illustrates distinguishably displaying a specific previous chat content, which is input as a second chat content, within a chat content input region 612 of a second chat window 610 by adjusting opacity (color density) of the specific previous chat content.

The mobile terminal 100 transmits the input second chat content [S560] to the second party and displays the transmitted second chat content on the chat content display region 611 of the second chat window. The transmission process is part of performing the chat with the second party [S540] and the display process can be a part of displaying the second chat window [S550]. The transmission process can be performed upon the user inputting a chat content transmitting command after completion of inputting the second chat content [S560].

A process for editing a previous chat content input as a second chat content is explained in detail with reference to the accompanying drawings. If a specific previous chat content, such as a chat content last transceived in the first chat, is input as the second chat content, the mobile terminal 100 can perform an operation to edit the input specific previous chat content prior its transmission, as illustrated in FIG. 17A.

Figure 17A:
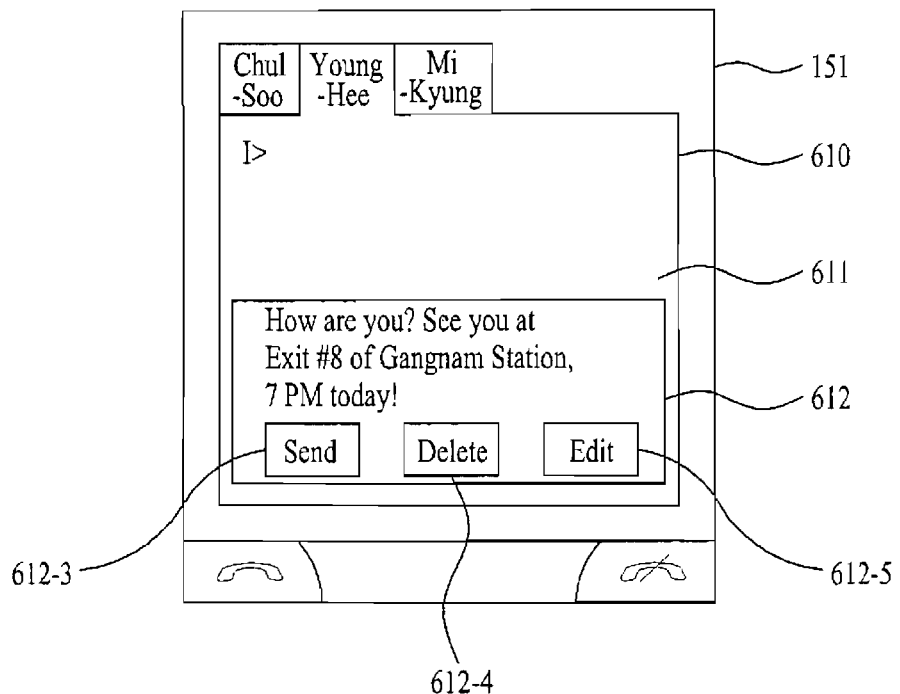
FIGS. 17A to 17D are diagrams illustrating a process for editing a previous chat content input as a chat content in a second chat and then sending the edited content according to one embodiment of the present invention.
Figure 17B:
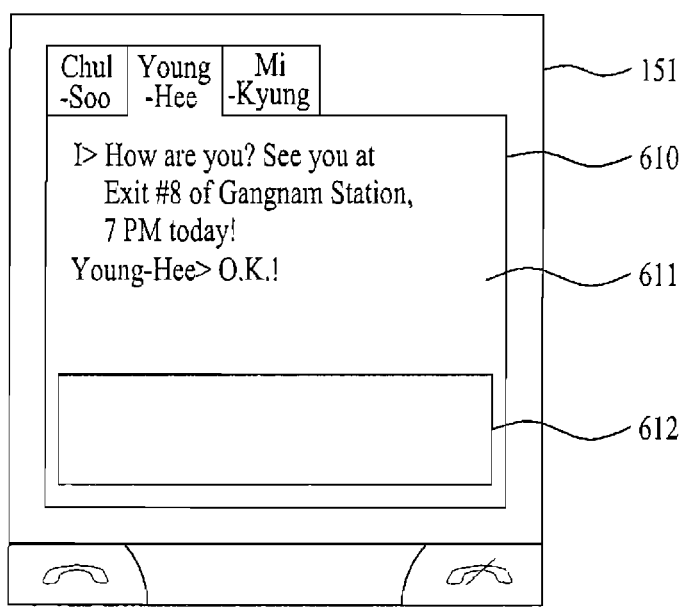

As illustrated in FIG. 17A, the mobile terminal 100 displays a specific previous chat content input as the second chat content on a chat content input region 612 and displays each region (hereinafter 'editing region') for receiving at least one editing command for the input second chat content. For example, the editing region can include a 'send' region 612-3 for receiving a transmit command for the second chat content, a 'delete' region 612-4 for receiving a delete command for the second chat content and an 'edit' region 612-5 for receiving an amend/add command for the second chat content.

If the 'send' region 612-3 is selected in FIG. 17A, the mobile terminal 100 transmits the input second chat content to Young Hee. The mobile terminal 100 also displays the transmitted second chat content on a chat content display region 611.

Figure 17C:
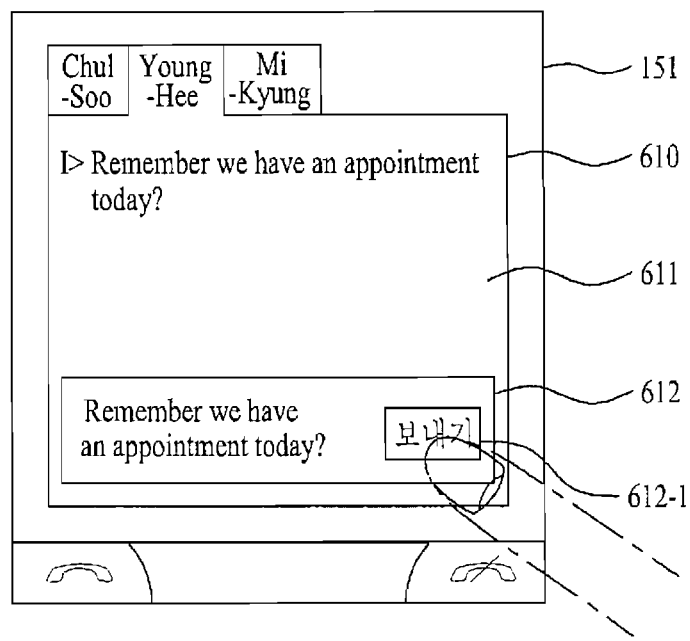

If the 'delete' region 612-4 is selected in FIG. 17A, the mobile terminal 100 deletes the specific previous chat content input as the second chat content, transmits a new chat content input by a user to Young Hee, and displays the transmitted new chat content on the chat content display region 611, as illustrated in FIG. 17C. If a new chat content is directly input by the user instead of selecting the specific editing region in FIG. 17A, the status shown in FIG. 17C can be configured.

Figure 17D:
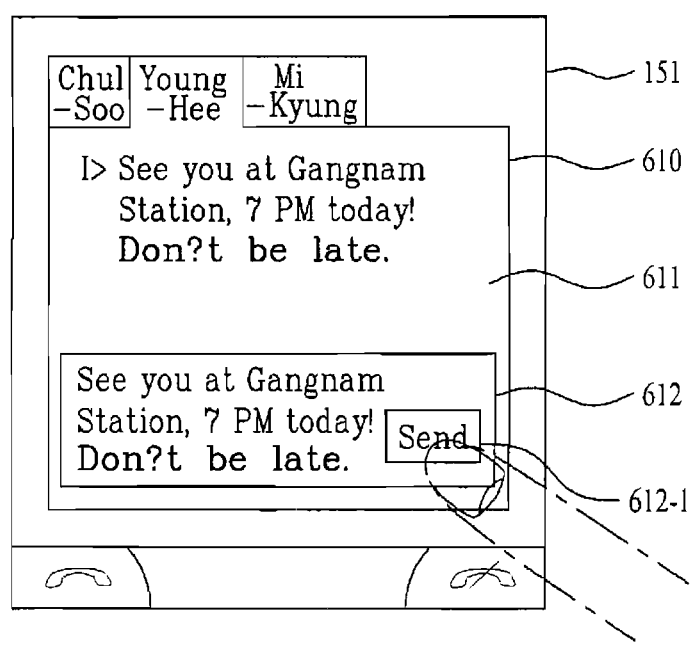

If the 'edit' region 612-5 is selected in FIG. 17C, the mobile terminal 100 partially amends or deletes the specific previous chat content input as the second chat content or receives a new chat content input by the user in addition to the input specific previous chat content. Subsequently, the mobile terminal 100 transmits the edited second chat content to Young Hee and displays the transmitted second chat content on the chat content display region 611, as illustrated in FIG. 17D. The newly added chat content can be displayed such that it can be distinguished from the specific previous chat content.

With reference to FIG. 5, before transmitting the specific previous chat content input as the second chat content [S560] to the second party, the mobile terminal 100 adds a receiving party to which the specific previous chat content is transmitted or additionally inputs the specific previous chat content. Specifically, at least one of the previous chat contents transmitted to the second party in the second chat [S580] is transmittable to an additional other party.

A process for adding a party for receiving a previous chat content in a second chat or inputting a plurality of previous chat contents is explained in detail with reference to the accompanying drawings. For clarity and convenience of explanation, it is assumed that a second party is 'Young Hee'.

Figure 18:
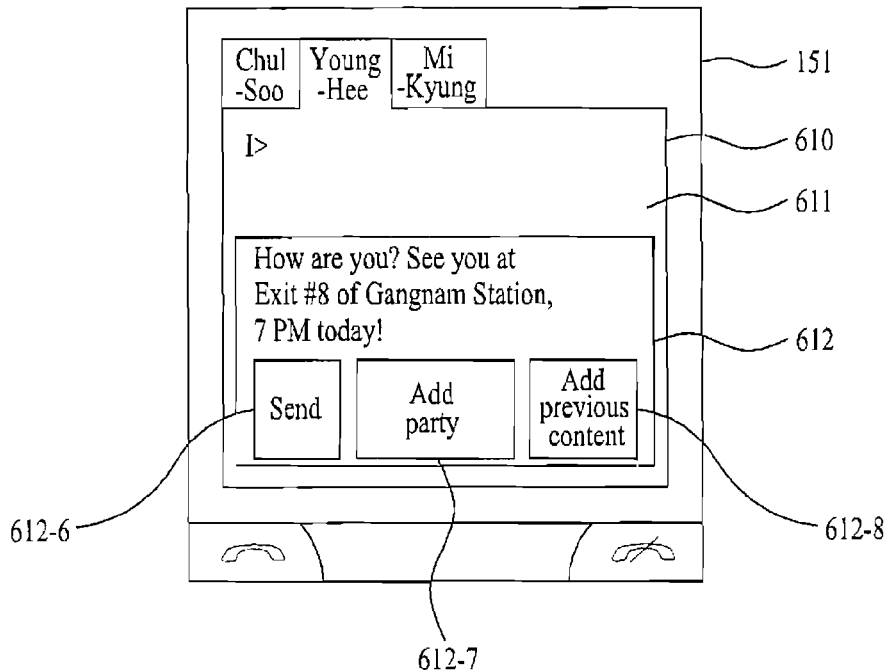
FIGS. 18 to 22 are diagrams illustrating a process of adding a party to receive a previous chat content in a second chat or inputting a plurality of previous chat contents according to one embodiment of the present invention.

As illustrated in FIG. 18, the mobile terminal 100 displays a specific previous chat content, such as a chat content last transceived in a first chat, which is input as a second chat content on a chat content input region 612 of a second chat window 610. A 'send' region 612-6 for receiving a command for transmitting the second chat content to Young Hee, an 'add party' region 612-7 for receiving a command for adding a receiving party and an 'add previous content' region 612-8 for receiving a command for adding a previous chat content can be displayed on the second chatting window 610.

If the 'send' region 612-6 is selected in FIG. 18, the mobile terminal 100 transmits the input second chat content to Young Hee and displays the transmitted second chat content on a chat content display region 611. The case where the 'add correspondent party' region 612-7 is selected in FIG. 18 is illustrated in FIGS. 19A to 20.

Figure 19A:
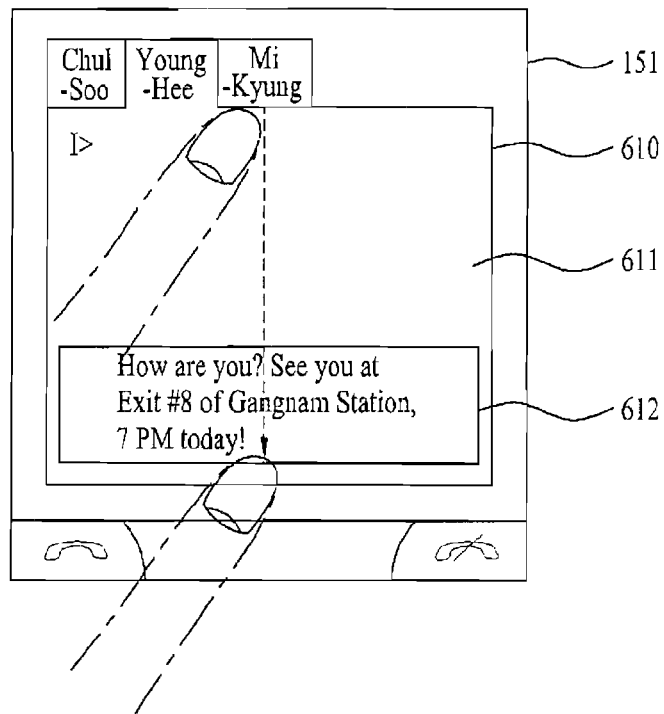

As illustrated in FIG. 19A, before a specific previous chat content input as a second chat content is transmitted, if a touch & drag operation to a chat content input region 612 containing identification information of an additional party is performed by a user, the mobile terminal 100 transmits the specific previous chat content input as the second chat content to the additional party. If an IM session is in process with the additional party, the transmitted specific previous chat content is displayed on a chat window for a chat with the additional party. If an IM session is not in process with the additional party, an IM session is started with the additional party and the specific previous chat content is transmitted to the additional party.

Figure 19B:
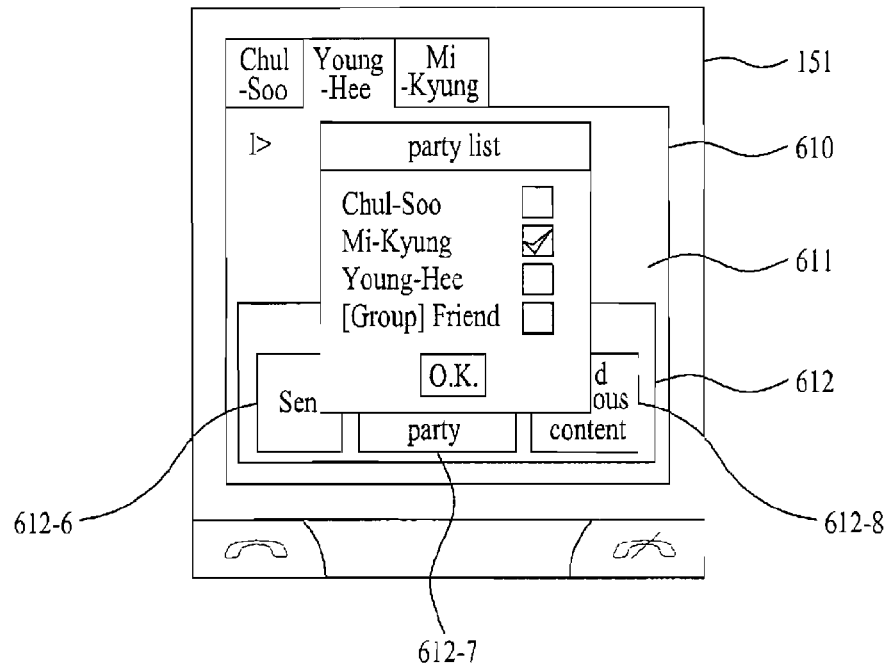
Figure 19C:
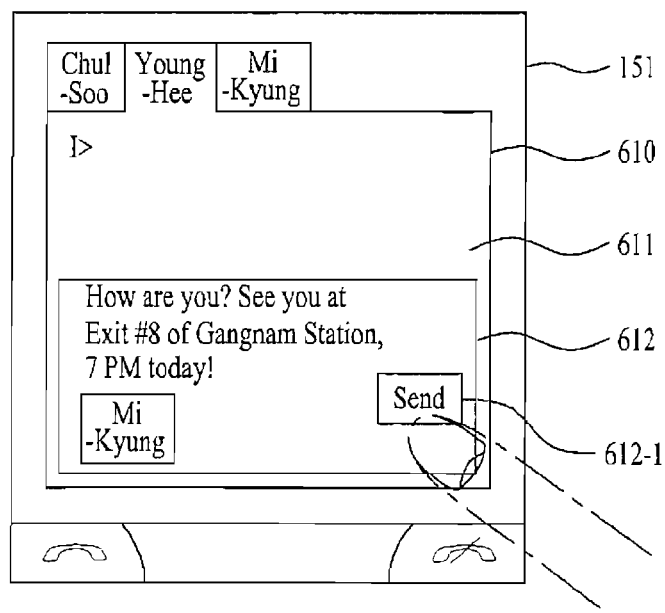

As illustrated in FIG. 19B, the mobile terminal 100 displays a list of addible parties on the screen and then transmits the specific previous chat content input as the second chat content to the additional parties selected from the list. If an additional party (e.g., 'Mi Kyung') is selected in FIG. 19A or FIG. 19B, the mobile terminal 100 displays additional notification information (e.g., identification information display) of the additional party.

Figure 20:
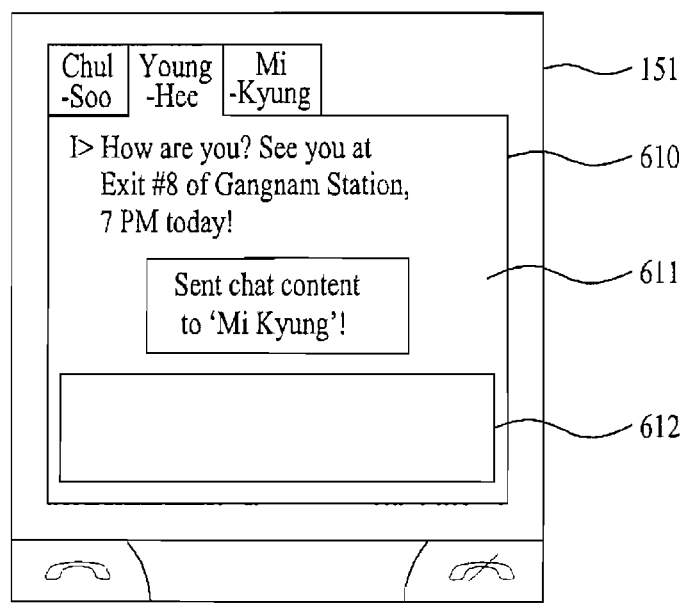

If the 'send' region 612-1 is selected after selection of the additional party, the mobile terminal 100 transmits the specific previous chat content input as the second chat content to both the second party and the additional party and then informs the additional party that the second chat content has been transmitted, as illustrated in FIG. 20.

Figure 21A:
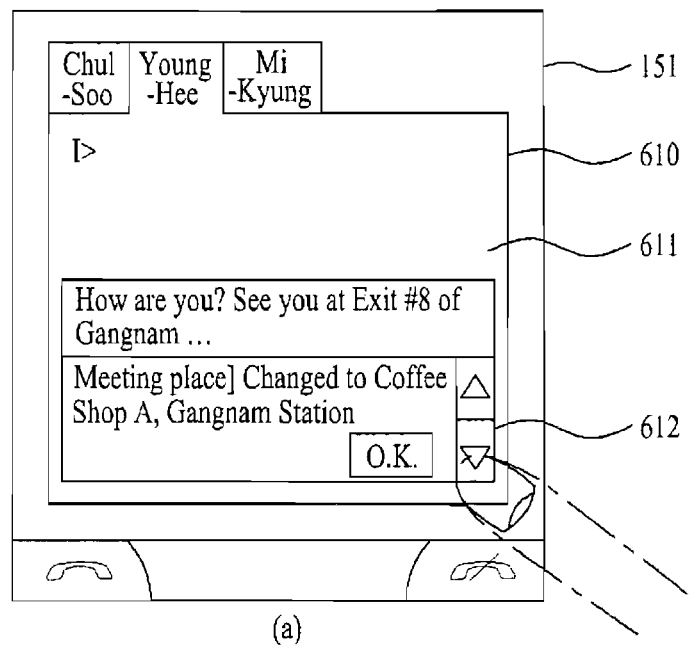
Figure 21A:
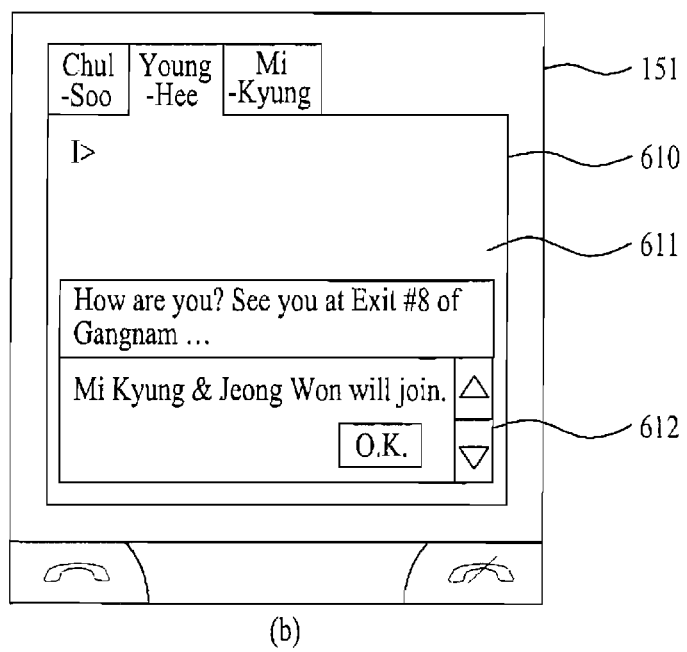
Figure 21B:
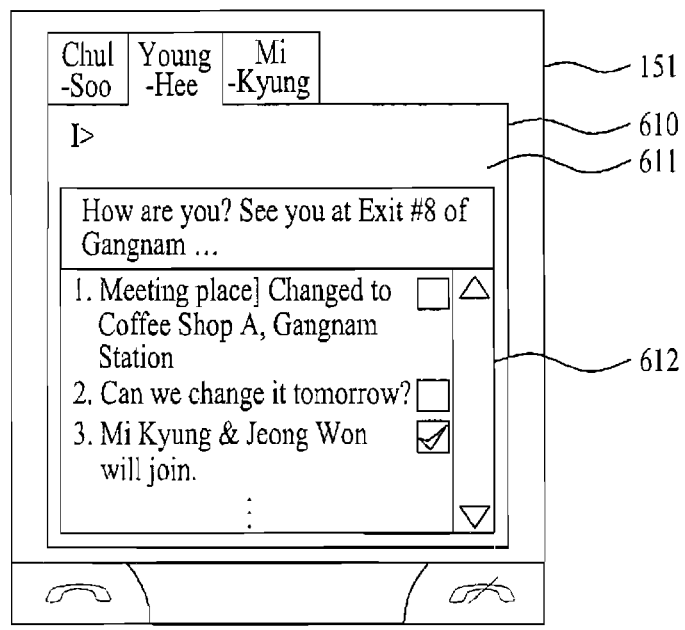
Figure 21C:
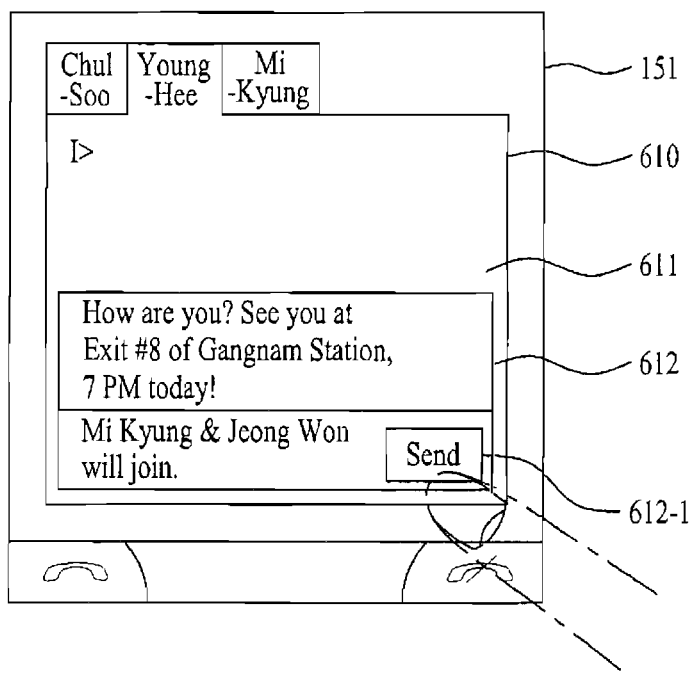
Figure 22:
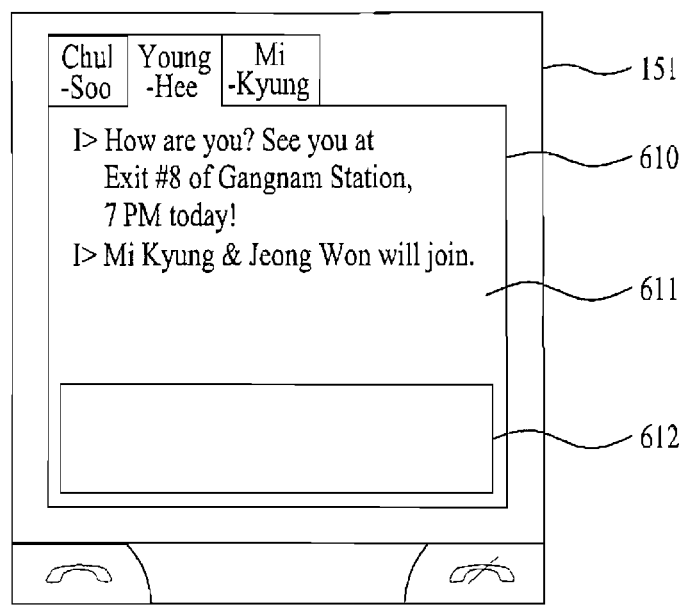
Figure 22:
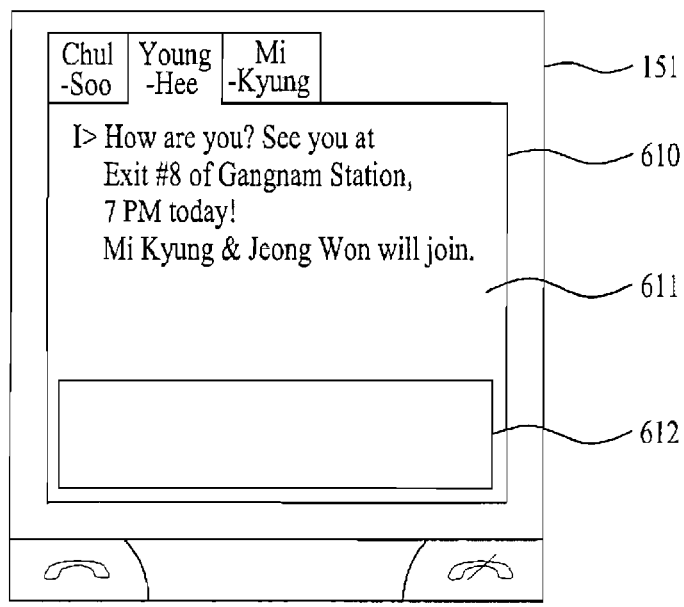

A case where the 'add previous content' region 612-8 is selected in FIG. 18 is illustrated in FIGS. 21A to 22. As illustrated in FIG. 21A, the mobile terminal 100 displays a previous chat content list with addible previous chat contents and then enables a user to select the additional previous chat content from the list. For example, the previous chat content list can include a previous chat content with a previous chat party selected by a user only. A method of selecting a previous chat content using a previous chat content list will be explained in detail later.

As illustrated in FIG. 21B, the mobile terminal 100 sequentially displays previous chat contents with reference to a predetermined order, such as an input time order in a previous chat according to a manipulation of a direction key. If an 'OK' region is selected, the mobile terminal 100 selects a currently displayed previous chat content as an additional previous chat content. As illustrated in FIG. 21A or FIG. 21B, a specific previous chat content previously input as a second chat content is displayed on a predetermined portion of a chat content input region 612 in addition to displaying the additional previous chat content selecting process.

As illustrated in FIG. 21C, the mobile terminal 100 displays a plurality of previous chat contents input as a second chat content on each chat content input region 612. If 'send' 612-1 is selected, the mobile terminal 100 transmits a plurality of the displayed previous chat contents to the second party. A plurality of the transmitted previous chat contents are displayed on the chat content display region 611 for a plurality of chat contents or for a single chat content.

As illustrated in FIG. 5, if a chat party is changed during the course of the second chat [S570], the mobile terminal 100 initiates a chat with the changed chat party [S580]. Changing the chat party [S570] and performing the chat with the changed chat party [S580] are identical to performing the second chat by switching the first chat to the second chat and their details are omitted in the following description.

The mobile terminal 100 according to the present invention may use a previous chat content list, a direction key manipulation or an initial character input in order to input a previous chat content as a chat content of a currently ongoing chat. The previous chat content includes a chat content or file(s) transceived in the previous chat with a random correspondent party as well as the currently ongoing chat. A process for inputting a previous chat content as a chat content of a currently ongoing chat using a previous chat content list is explained in detail with reference to the accompanying drawings.

Figure 23:
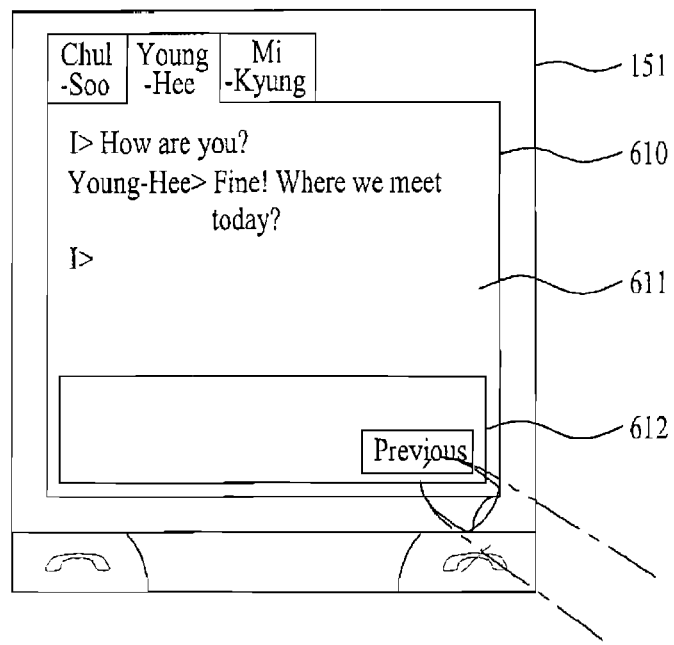
FIGS. 23 to 25 are diagrams illustrating a process for inputting a previous chat content as a chat content of an ongoing chat using a previous chat content list according to one embodiment of the present invention.

During a chat using an IMS, the mobile terminal 100 may receive a signal (hereinafter 'previous chat content input signal') for inputting a previous chat content as a chat content of a currently ongoing chat, as illustrated in FIG. 23. For example, selecting a menu item, a key or a key region ('previous') corresponding to a previous chat content may be utilized.

Figure 24A:
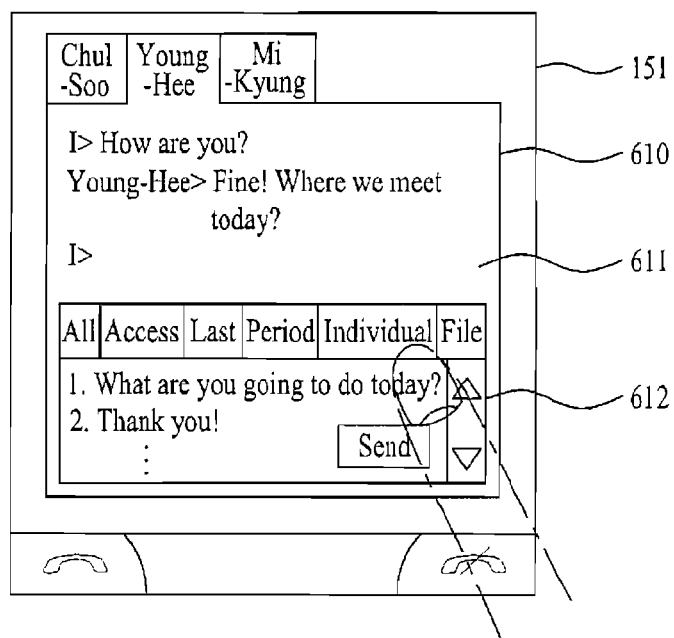

If the previous chat content input signal is input in FIG. 23, the mobile terminal 100 displays a previous chat content list including previous chat contents, as illustrated in FIG. 24A. For example, the mobile terminal 100 displays a list including entire previous chat contents, a list including a previous chat content with a current chat party or a list including previous chat contents of all parties currently connected to the IM sessions.

Alternatively, the mobile terminal 100 provides a user with a selectable list constructing condition and then displays a previous chat content list corresponding to a list constructing condition selected by the user. This is explained in detail with reference to FIGS. 24A to 25. FIG. 24A illustrates a screen configuration in which a plurality of selectable list constructing conditions are provided in a tag format.

For example, a previous chat content list is constructed with previous chat contents with all parties if 'all' is selected and a previous chat content list is constructed with previous chat contents with a currently IMS-accessed party or a currently OMS-connected party if 'access' is selected. If 'last' is selected, a previous chat content list is constructed with previous chat contents in a chat performed immediately before a currently ongoing chat. If 'predetermined period' is selected, a previous chat content list is constructed with previous chat contents of all chat performed for the predetermined period. If 'file' is selected, a previous chat content list is constructed with identification information of a file transceived in a previous chat.

It is understood that various conditions can be further included in the list constructing conditions as well as the above-described conditions. The list constructing condition can include a 'user-selected party' or a 'user-selected chat'.

The previous chat content list includes previous chat contents with a party selected by a user if the 'user-selected party' list constructing condition is selected. If the 'user-selected chat' list constructing condition is selected, the previous chat content list includes previous chat contents transceived in the chat selected by the user.

If 'individual' is selected from the list constructing conditions illustrated in FIG. 24A, the mobile terminal 100 displays identification information for each selectable previous chat party. The mobile terminal 100 then displays a previous chat content list constructed with a previous chat content with a party corresponding to identification information selected by a user, as illustrated in FIG. 24B.

Figure 24B:
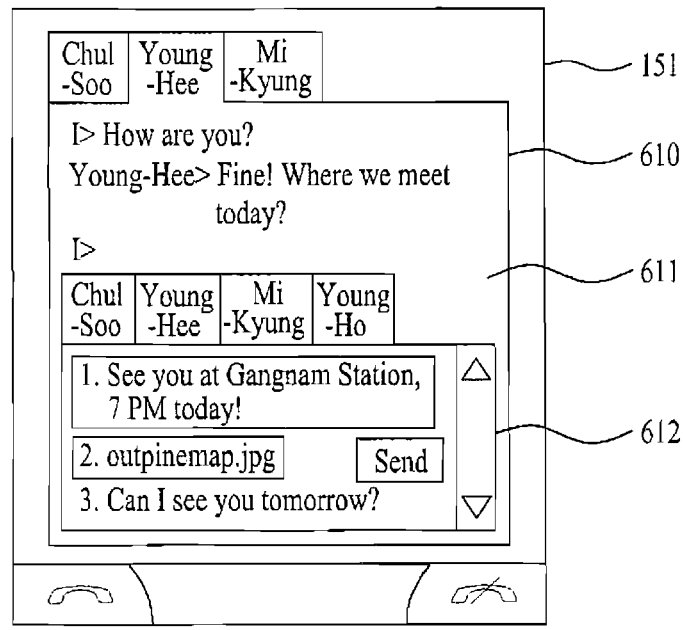

As illustrated in FIG. 24B, the mobile terminal 100 selects at least one previous chat content according to a selection made by a user. The mobile terminal 100 then inputs the selected at least one previous chat content as a chat content of a currently ongoing chat.

Figure 25:
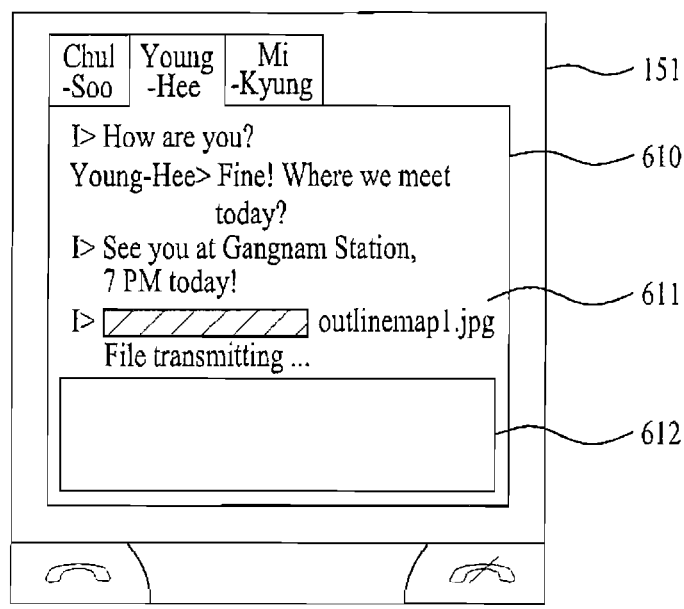

When transmitting the selected at least one previous chat content to a party, the mobile terminal 100 displays the transmitted at least one previous chat content on a chat content display region 611, as illustrated in FIG. 25. Furthermore, if the previous chat content includes a file, the mobile terminal 100 transmits the file to the party. The previous chat content list can include information related to a time for transceiving a previous chat content or information related to a party.

A process for inputting a previous chat content as a chat content of a currently ongoing chat using a direction key is explained in detail with reference to the accompanying drawings. If a previous chat content input signal is input in FIG. 23, the mobile terminal 100 displays a direction key for receiving a command signal for shifting to a first previous chat content and a previous chat content located before or after the first previous chat content on a chat content input region 612, as illustrated in FIG. 26A.

The direction key can be provided as a virtual key on the touch screen shown in FIG. 23. The direction key can include a direction key provided on a keypad of the mobile terminal 100 or a side key for inputting a direction.

For example, the first previous chat content can include one of all previous chat contents, a previous chat content of a current chat party or a previous chat content of all parties currently connected to IM sessions. The mobile terminal 100 provides settable previous chat content conditions to a user and then displays a previous chat content corresponding to a previous chat content condition selected by the user. This is explained in detail with reference to FIGS. 26A to 27.

Figure 26A:
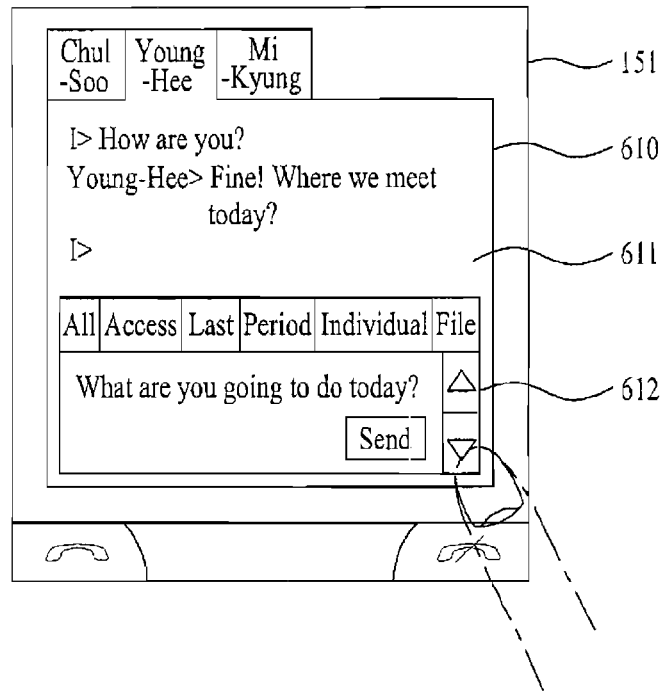
FIGS. 26A to 27 are diagrams illustrating a process for inputting a previous chat content as a chat content of an ongoing chat using a direction key according to one embodiment of the present invention.

FIG. 26A illustrates a screen configuration in which settable previous chat content conditions are provided in a tag format. For example, a first previous chat content is one of previous chat contents with all correspondent parties if 'all' is selected. If 'access' is selected, the first previous chat content is one of previous chat contents of a currently IMS-accessed correspondent party or a currently IMS-session connected party. If 'last' is selected, the previous chat content is one of previous chat contents in a chat performed immediately before a currently ongoing chat. If 'period' is selected, the previous chat content is one of previous chat contents of all chats performed for a predetermined period. If 'file' is selected, the previous chat content is one of all files transceived in a previous chat.

If 'individual' is selected from the previous chat content conditions illustrated in FIG. 26A, the mobile terminal 100 displays identification information on each selectable previous chat party. The mobile terminal 100 then displays one of previous chat contents of a party corresponding to the identification information selected by a user from the displayed identification information as the first previous chat content.

It is understood that various other conditions can be included in the previous chat content conditions as well as the above-described conditions. The previous chat content conditions can include a 'user-selected party' or a 'user-selected chat'.

The first previous chat content can include one of previous chat contents with a party selected by a user. If the 'user-selected chat' is selected, the first previous chat content can include one of previous chat contents transceived in the chat selected by the user.

Figure 26B:
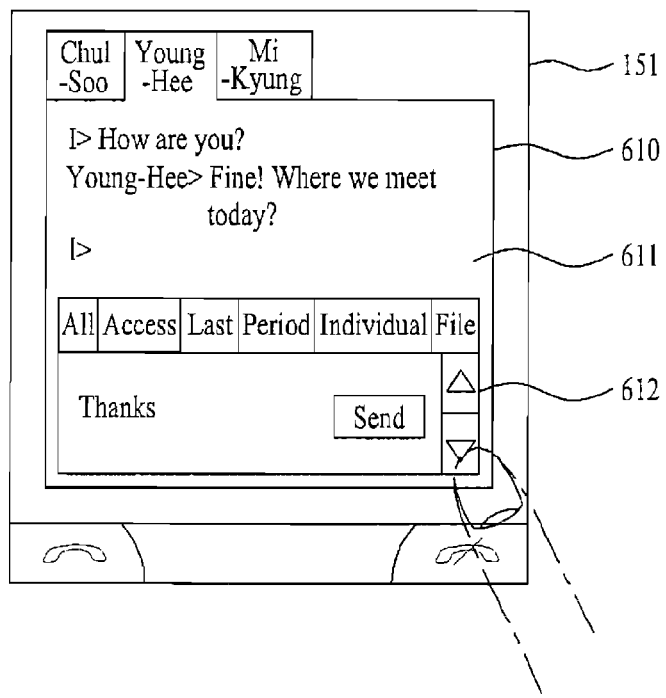
Figure 26C:
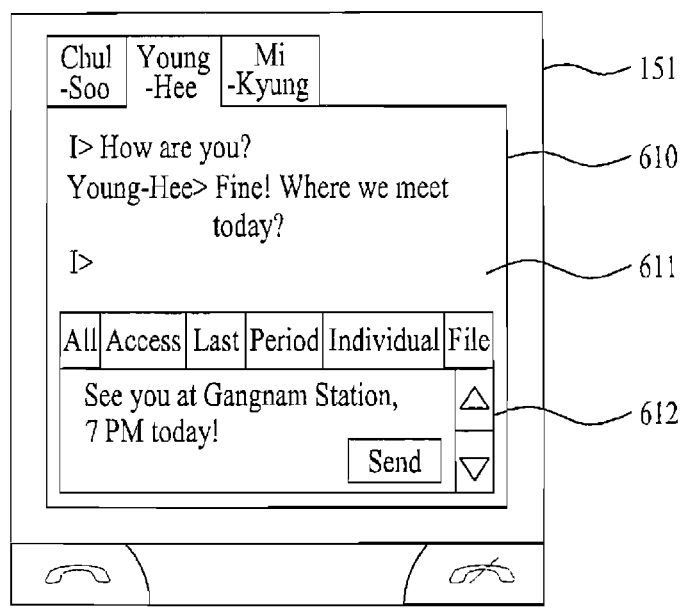

If the down direction key is selected in FIG. 26A, the mobile terminal 100 inputs a previous second chat content located in order next to a currently displayed first previous chat content as a chat content, as illustrated in FIG. 26B. If the down direction key is selected in FIG. 26B, the mobile terminal 100 inputs a third chat content located in order next to the second previous chat content as a chat content, as illustrated in FIG. 26C.

Figure 27:
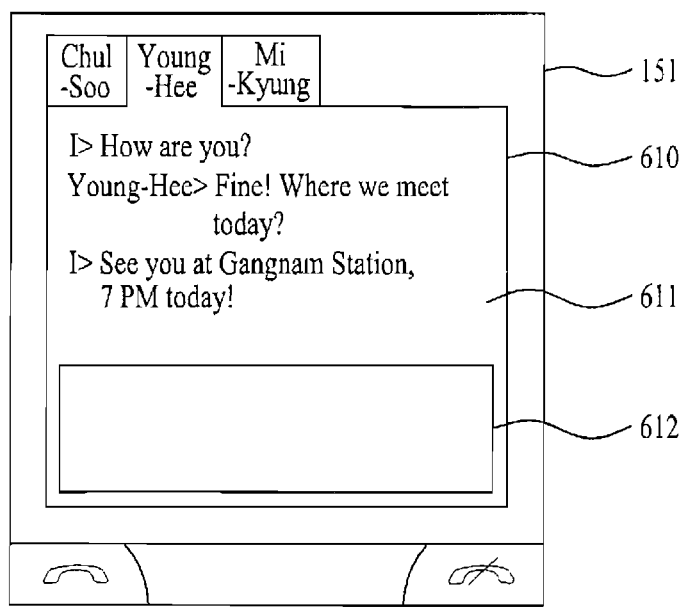
Figure 29:
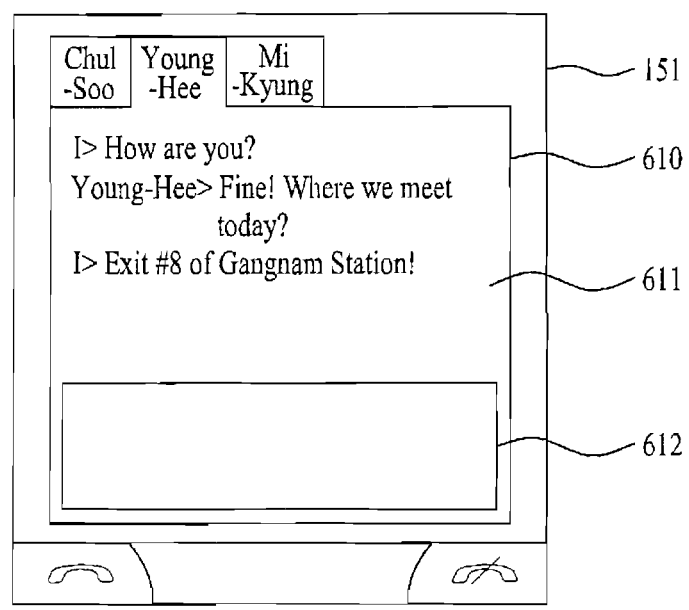

In this way, the order of the previous chat content can be set based on an input time in a previous chat. The order of the previous chat content can be set by a user and a specific previous chat content can be excluded from the order according to a selection made by the user. When transmitting the input previous chat content to a party, the mobile terminal 100 displays the transmitted previous chat content on a chat content display region 611 (refer to FIG. 29), as illustrated in FIG. 27.

A process for inputting a previous chat content as a chat content of a currently ongoing chat using an initial character input is explained in detail with reference to the accompanying drawings. If a previous chat content input signal is input in FIG. 23, the mobile terminal 100 sets a status for receiving information for searching previous chat contents, as illustrated in FIG. 28A.

Figure 28A:
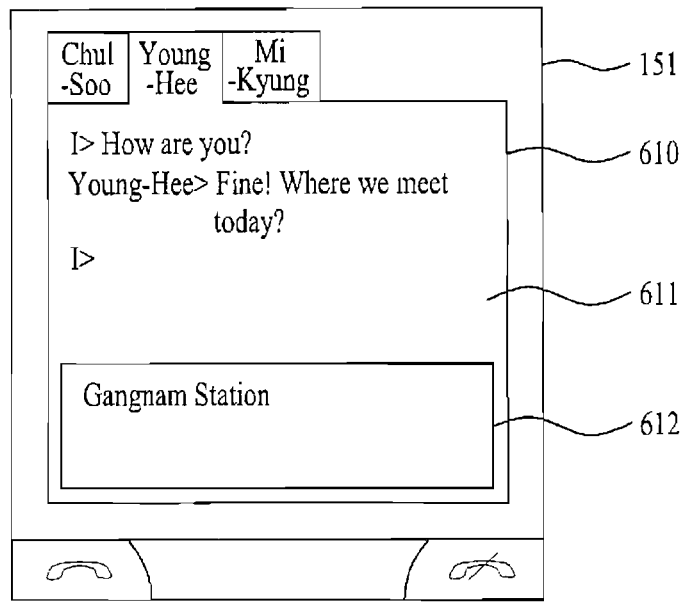
FIGS. 28A to 29 are diagrams illustrating a process for inputting a previous chat content as a chat content of an ongoing chat using an initial character input according to one embodiment of the present invention.
Figure 28B:
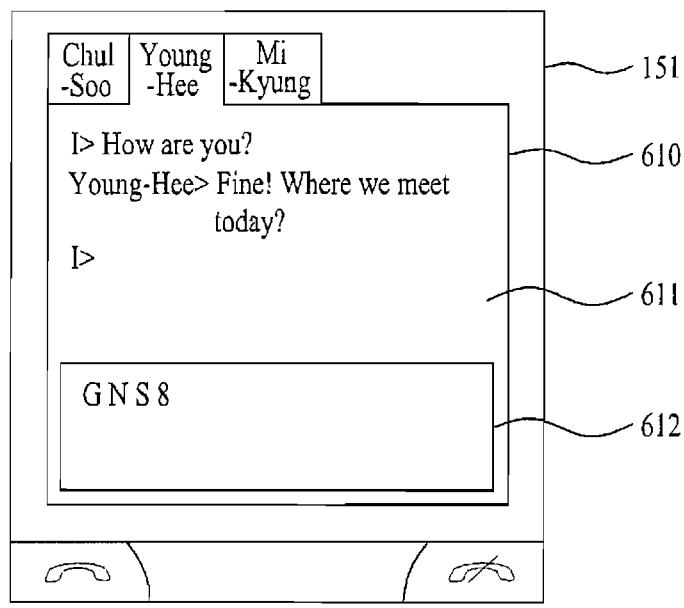
Figure 28C:
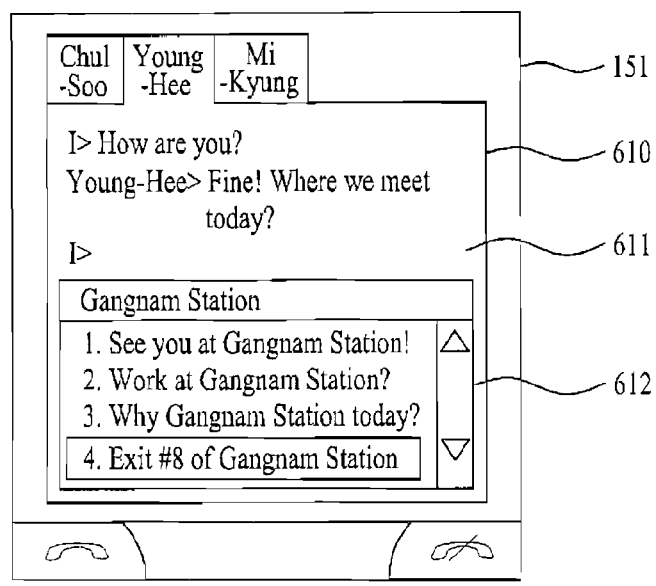

As illustrated in FIG. 28A, the mobile terminal 100 receives an input of at least one word or character from a user, which is provided as information for searching for a previous chat content. The mobile terminal 100 displays a list including at least one previous chat content containing the word or character received, as illustrated in FIG. 28C, and then allows a user to select a specific previous chat content from the displayed list.

Figure 28D:
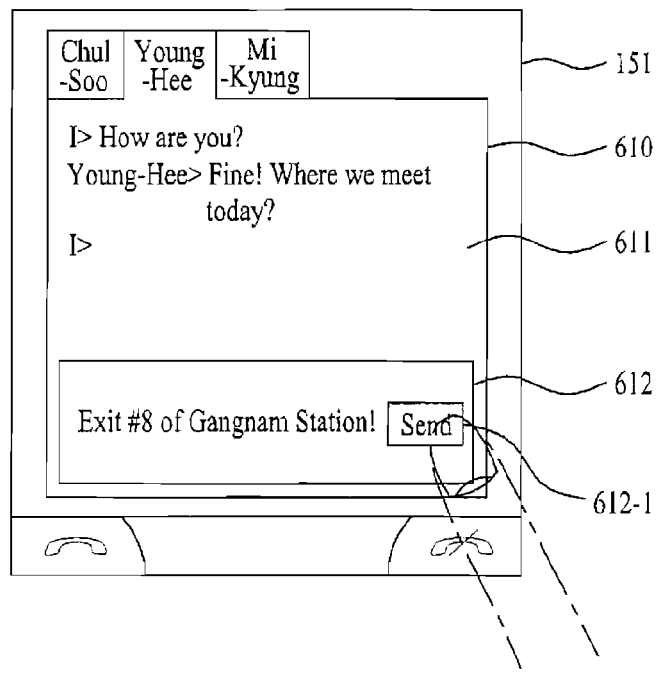

The mobile terminal 100 them inputs the selected specific previous chat content as the chat content. The mobile terminal 100 transmits the input specific previous chat content to a party when 'send' 612-1 selected in FIG. 28D and displays the transmitted specific previous chat content on the chat content display region 611.

The mobile terminal 100 allows a user to select a specific previous chat content from previous chat content(s) including the character input in FIG. 28A. Alternatively, the mobile terminal 100 displays a random previous chat content including the word or character input in FIG. 28A on the chat content input region 612 and allows a user to select a previous chat content located before or after the displayed random previous chat content via manipulation of a direction key by searching the previous chat contents.

The present invention provides several effects or advantages. First, the present invention enables a specific one of previous chat contents to be input as a chat content of a currently ongoing chat, thereby alleviating the inconvenience of inputting chat contents one-by-one. Second, if a plurality of chat sessions is set, the present invention can transmit a specific previous chat content to all parties connected to a chat session, thereby making it unnecessary to input a chat content by opening a chat window for each of the parties one-by-one.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal for performing a chat, the mobile terminal comprising:
   a wireless communication unit configured to perform the chat with at least one chat party using an instant messaging service;
   a display unit configured to display at least one chat window including a chat content display region and a chat content input region while the chat with the at least one chat party is ongoing, wherein the chat content display region displays at least one message previously transmitted to the at least one chat party and the chat content input region displays at least one new message that is to be transmitted to the at least one chat party;
   a user input unit configured to receive a text data by typing input; and
   a controller configured to:
      control the wireless communication unit to perform the chat with a first chat party,
      control the display unit to display a first chat window when the first chat party is selected,
      control the wireless communication unit to perform the chat with a second chat party when the second chat party is selected,
      control the display unit to display a second chat window including a chat content display region and a chat content input region while the chat with the second chat party is ongoing,
      control the display unit to display a lastly transmitted message of a plurality of previous chats with the first chat party in the chat content input region of the second chat window for transmission to the second chat party, and search at least one transmitted message of the chat with the first chat party via initial character search based on the text data received via the user input unit and control the display unit to display a result of the search in the chat content input region of the second chat window instead of displaying the lastly transmitted message when the text data is received via the user input unit.

2. The mobile terminal of claim 1, wherein the controller is further configured to control the display unit to:

delete the lastly transmitted message of the plurality of previous chats with the first chat party from the chat content input region when at least one new text message is input in the chat content input region; or edit the lastly transmitted message of the plurality of previous chats with the first chat party when an editing function is selected.

3. The mobile terminal of claim 1, wherein the controller is further configured to:

control the display unit to display identification information of at least one party that may be selected as the at least one chat party under control of the controller; and process a selection of the second chat party on the display unit using the displayed identification information.

4. The mobile terminal of claim 1, wherein the controller is further configured to control the display unit to display the content of the lastly transmitted message of the plurality of previous chats with the first chat party in the chat content input region of the second chat window such that the content of the lastly transmitted message of the plurality of previous chats is distinguishable from content of the chat with the second chat party.

5. The mobile terminal of claim 1, wherein the controller is further configured to control the display unit to switch the first chat window to the second chat window on a same region of the display unit if the second chat party is selected while the chat with the first chat party is ongoing.

6. The mobile terminal of claim 1, wherein the controller is further configured to control the display unit to display the transmitted content of the lastly transmitted message of the plurality of previous chats with the first chat party, the transmitted new chat content or the transmitted edited chat content on the chat content display region of the second chat window.

7. The mobile terminal of claim 1, wherein the controller is further configured to:

process an external signal to add a third chat party to receive the content of the lastly transmitted message of the plurality of previous chats with the first chat party; and control the wireless communication unit to transmit the content of the lastly transmitted message of the plurality of previous chats with the first chat party to the added third chat party.

8. The mobile terminal of claim 1, wherein the controller is further configured to control the display unit to display content of a specific one of a plurality of previous chats with the first chat party that also included at least one additional chat party as content of the chat with the second chat party.

9. The mobile terminal of claim 1, wherein the user input unit is further configured to receive an input via a direction key manipulation and wherein the controller is further configured to:

process the input received via the direction key manipulation in order to select at least one specific previous chat content from a displayed list of previous chat contents with at least one chat party; and control the display unit to display the selected at least one specific previous chat content as content of a chat with each of the first and second chat parties according to the received input.

10. The mobile terminal of claim 1, further comprising:

a memory configured to store content of the chat with the first and second chat parties.

11. A method for performing a chat in a mobile terminal, the method comprising:

displaying at least one chat window including a chat content display region and a chat content input region on a display while a chat with at least one chat party is ongoing, wherein the chat content display region displays at least one message previously transmitted to the at least one chat party and the chat content input region displays at least one new message that is to be transmitted to the at least one chat party;

performing the chat with a first chat party;

displaying a first chat window on the display when the first chat party is selected;

performing the chat with a second chat party when the second chat party is selected;

displaying a second chat window including a chat content display region and a chat content input region while the chat with the second chat party is ongoing;

displaying a lastly transmitted message of a plurality of previous chats with the first chat party in the chat content input region of the second chat window for transmission to the second party; and searching at least one transmitted message of the chat with the first chat party via initial character search based on a text data and displaying a result of the search in the chat content input region of the second chat window instead of displaying the lastly transmitted message when the text data is received via a user input unit by typing input.

12. The method of claim 11, further comprising:

deleting the lastly transmitted message of a plurality of previous chats with the first chat party from the chat content input region when at least one new text message is input in the chat content input region; or editing the lastly transmitted message of a plurality of previous chats with the first chat party when an editing function is selected.

13. The method of claim 11, further comprising:

displaying identification information of at least one party on the display that may be selected as the at least one chat party; and processing a selection of the second chat party using the displayed identification information.

14. The method of claim 11, further comprising displaying the content of the lastly transmitted message of the plurality of previous chats with the first chat party in the chat content input region of the second chat window such that the content of the lastly transmitted message of the plurality of previous chats is distinguishable from content of the chat with the second chat party.

15. The method of claim 11, further comprising switching the first chat window to the second chat window on a same region of the display if the second chat party is selected while the chat with the first chat party is ongoing.

16. The method of claim 11, further comprising displaying the transmitted content of the lastly transmitted message of the plurality of previous chats with the first chat party, the transmitted new chat content or the transmitted edited chat content on the chat content display region of the second chat window.

17. The method of claim 11, further comprising:
processing an external signal to add a third chat party to receive the content of the lastly transmitted message of the plurality of previous chats with the first chat party; and
transmitting the content of the lastly transmitted message of the plurality of previous chats with the first chat party to the added third chat party.

18. The method of claim 11, further comprising displaying content of a specific one of a plurality of previous chats with the first chat party that also included at least one additional chat party as content of the chat with the second chat party.

19. The method of claim 11, further comprising:
receiving an input via a direction key manipulation to select at least one specific previous chat content from a displayed list of previous chat contents with at least one chat party; and
displaying the selected at least one specific previous chat content as content of a chat with each of the first and second chat parties according to the received input.

20. The method of claim 11, further comprising storing content of the chat with the first and second chat parties.

* * * * *